(12) United States Patent
Oneufer et al.

(10) Patent No.: US 10,320,162 B2
(45) Date of Patent: *Jun. 11, 2019

(54) MOTOR CONTROL CENTER UNITS WITH RETRACTABLE STABS AND INTERLOCKS

(71) Applicant: Eaton Intelligent Power Limited, Dublin (IE)

(72) Inventors: Stephen William Oneufer, Fayetteville, NC (US); Robert Allan Morris, Fayetteville, NC (US); Daniel Boyd Kroushl, Clayton, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,949

(22) Filed: Jun. 13, 2018

(65) Prior Publication Data

US 2018/0294628 A1 Oct. 11, 2018

Related U.S. Application Data

(63) Continuation of application No. 15/352,825, filed on Nov. 16, 2016, now Pat. No. 10,020,642, which is a (Continued)

(51) Int. Cl.
*H02B 11/24* (2006.01)
*H02B 11/173* (2006.01)
(Continued)

(52) U.S. Cl.
CPC .......... *H02B 11/24* (2013.01); *H01H 71/128* (2013.01); *H02B 1/14* (2013.01); *H02B 1/36* (2013.01);
(Continued)

(58) Field of Classification Search
CPC . H01H 9/22; H01H 71/56; H02B 1/36; H02B 11/133; H02B 11/24
See application file for complete search history.

(56) References Cited

U.S. PATENT DOCUMENTS 1,838,898 A 12/1931 Aldeen
2,042,886 A 6/1936 Ferguson
(Continued)

FOREIGN PATENT DOCUMENTS

FR 2 747 877 10/1997
FR 2 814 321 3/2002
(Continued)

OTHER PUBLICATIONS

"Arc flash—the threat that is real" *Eaton* Product Aid: Freedom Arc Resistant Motor Control Center (2 pages) (Mar. 2014).
(Continued)

*Primary Examiner* — Robert J Hoffberg
(74) *Attorney, Agent, or Firm* — Myers Bigel, P.A.

(57) ABSTRACT

Motor control centers have units or buckets with one or more sliding shutters that controllably block access to a stab isolation port based on position of the operator disconnect handle using attached cams that slide the shutter right and left. A front panel of the unit or bucket may also be configured to pivot out about a long axis associated with a bottom long side thereof.

20 Claims, 16 Drawing Sheets

Related U.S. Application Data continuation of application No. 14/318,971, filed on Jun. 30, 2014, now Pat. No. 9,531,169.

(51) Int. Cl.
| | | |
|---|---|---|
| *H02B 1/46* | (2006.01) | |
| *H02B 1/14* | (2006.01) | |
| *H01H 71/12* | (2006.01) | |
| *H02B 11/133* | (2006.01) | |
| *H02B 1/36* | (2006.01) | |

(52) U.S. Cl.
CPC ............ *H02B 1/46* (2013.01); *H02B 11/133* (2013.01); *H02B 11/173* (2013.01)

(56) References Cited

U.S. PATENT DOCUMENTS

| | | | |
|---|---|---|---|
| 2,809,085 A | 10/1957 | Fall | |
| 2,914,707 A | 11/1959 | Timmerman | |
| 2,921,998 A | 1/1960 | Pokorny et al. | |
| 3,203,575 A | 8/1965 | Anderson et al. | |
| 3,479,104 A | 11/1969 | Kobryner | |
| 4,024,441 A | 5/1977 | Coyle et al. | |
| 4,086,452 A | 4/1978 | Collins | |
| 4,090,230 A | 5/1978 | Fuller et al. | |
| 4,206,944 A | 6/1980 | Kumagai et al. | |
| 4,371,223 A | 2/1983 | Grunert et al. | |
| 4,486,815 A | 12/1984 | Takahashi | |
| 4,503,408 A | 3/1985 | Mrenna et al. | |
| 4,612,424 A | 9/1986 | Clark et al. | |
| 4,754,367 A | 6/1988 | Bohnen | |
| 4,806,710 A | 2/1989 | Kalvaitis et al. | |
| 4,835,350 A | 5/1989 | Ozu et al. | |
| 4,926,286 A | 5/1990 | Maki et al. | |
| 5,006,682 A | 4/1991 | Sloff et al. | |
| 5,343,355 A | 8/1994 | Ishikawa | |
| 5,609,244 A | 3/1997 | Reiter | |
| 5,625,531 A | 4/1997 | Padilla et al. | |
| 5,910,760 A | 6/1999 | Malingowski et al. | |
| 6,031,192 A | 2/2000 | Liebetruth | |
| 6,194,983 B1 | 2/2001 | Bogdon et al. | |
| 6,689,968 B2 * | 2/2004 | Trivette | H01H 33/666 200/50.21 |
| 6,711,001 B2 | 3/2004 | Hernandez et al. | |
| 6,943,999 B2 | 9/2005 | Gray et al. | |
| 7,186,933 B2 | 3/2007 | Turner | |
| 7,420,133 B2 | 9/2008 | Farrow et al. | |
| 7,510,223 B2 | 3/2009 | Malkowski, Jr. et al. | |
| 7,684,199 B2 | 3/2010 | Yee et al. | |
| 7,688,572 B2 | 3/2010 | Yee et al. | |
| 7,800,888 B2 | 9/2010 | Morris et al. | |
| 7,965,493 B2 | 6/2011 | Leeman et al. | |
| 7,987,555 B2 | 8/2011 | Chen et al. | |
| 8,108,971 B2 | 2/2012 | Florek | |
| 8,198,557 B2 * | 6/2012 | Lee | H02B 11/133 200/50.21 |
| 8,199,022 B2 | 6/2012 | Morris et al. | |
| 8,243,422 B2 | 8/2012 | Leeman et al. | |
| 8,248,761 B2 | 8/2012 | Leeman et al. | |
| 8,294,051 B2 * | 10/2012 | Park | H02B 11/133 200/50.21 |
| 8,305,736 B2 | 11/2012 | Yee et al. | |
| 8,395,064 B2 * | 3/2013 | Kim | H02B 11/133 200/50.21 |
| 8,511,510 B2 | 8/2013 | Pratte et al. | |
| 8,537,518 B2 | 9/2013 | Morris et al. | |
| 8,590,106 B2 | 11/2013 | Lu | |
| 8,791,362 B2 | 7/2014 | Kumar | |
| 8,817,454 B2 | 8/2014 | Morris et al. | |
| 8,934,218 B2 | 1/2015 | Morris | |
| 8,952,252 B2 | 2/2015 | Bugaris et al. | |
| 9,153,947 B2 | 10/2015 | Fleitmann et al. | |
| 9,451,718 B2 | 9/2016 | Oneufer et al. | |
| 9,531,169 B2 | 12/2016 | Oneufer et al. | |
| 9,607,784 B2 * | 3/2017 | Benke | H01H 9/24 |
| 9,831,645 B2 | 11/2017 | Espinosa Gutierrez et al. | |
| 9,843,174 B2 * | 12/2017 | Cieply | H02B 11/133 |
| 9,882,358 B2 * | 1/2018 | Kim | H02B 11/127 |
| 9,888,589 B2 | 2/2018 | Oneufer et al. | |
| 10,020,642 B2 * | 7/2018 | Oneufer | H02B 1/46 |
| 2008/0022673 A1 | 1/2008 | Morris et al. | |
| 2008/0023211 A1 | 1/2008 | Yee et al. | |
| 2008/0258667 A1 | 10/2008 | Morris et al. | |
| 2009/0086414 A1 | 4/2009 | Yee et al. | |
| 2013/0077210 A1 | 3/2013 | Morris | |
| 2013/0088812 A1 | 4/2013 | Yee et al. | |
| 2014/0362498 A1 | 12/2014 | Morris et al. | |
| 2015/0103472 A1 | 4/2015 | Oneufer et al. | |
| 2015/0221458 A1 | 8/2015 | Oneufer et al. | |
| 2015/0380910 A1 | 12/2015 | Oneufer et al. | |
| 2015/0382492 A1 | 12/2015 | Oneufer et al. | |
| 2017/0155234 A1 * | 6/2017 | Benke | H01H 9/24 |
| 2017/0264085 A1 | 9/2017 | Cieply et al. | |
| 2018/0083426 A1 | 3/2018 | Ali et al. | |
| 2018/0083513 A1 | 3/2018 | Pharne | |

FOREIGN PATENT DOCUMENTS

| | | |
|---|---|---|
| JP | S 59-9459 U | 1/1984 |
| JP | 2011-234542 A | 11/2011 |
| WO | WO 2015/047236 A1 | 4/2015 |

OTHER PUBLICATIONS

Drawings/Views of internal components of an MCC (FLASHGARD) unit sold by Eaton, Inc. (2012) (6 pages).

International Search Report and the Written Opinion of the International Searching Authority corresponding to related International Application No. PCT/IB2015/054355 (17 pages) (dated Oct. 26, 2015).

International Search Report and the Written Opinion of the International Searching Authority corresponding to related International Application No. PCT/IB2015/054356 (11 pages) (dated Aug. 19, 2015).

International Search Report and the Written Opinion of the International Searching Authority corresponding to International Patent Application No. PCT/US2017/057802 (15 pages) (dated Jan. 19, 2018).

Invitation to Pay Additional Fees for related International Application No. PCT/IB2015/054355 (6 pages) (dated Aug. 19, 2015).

* cited by examiner

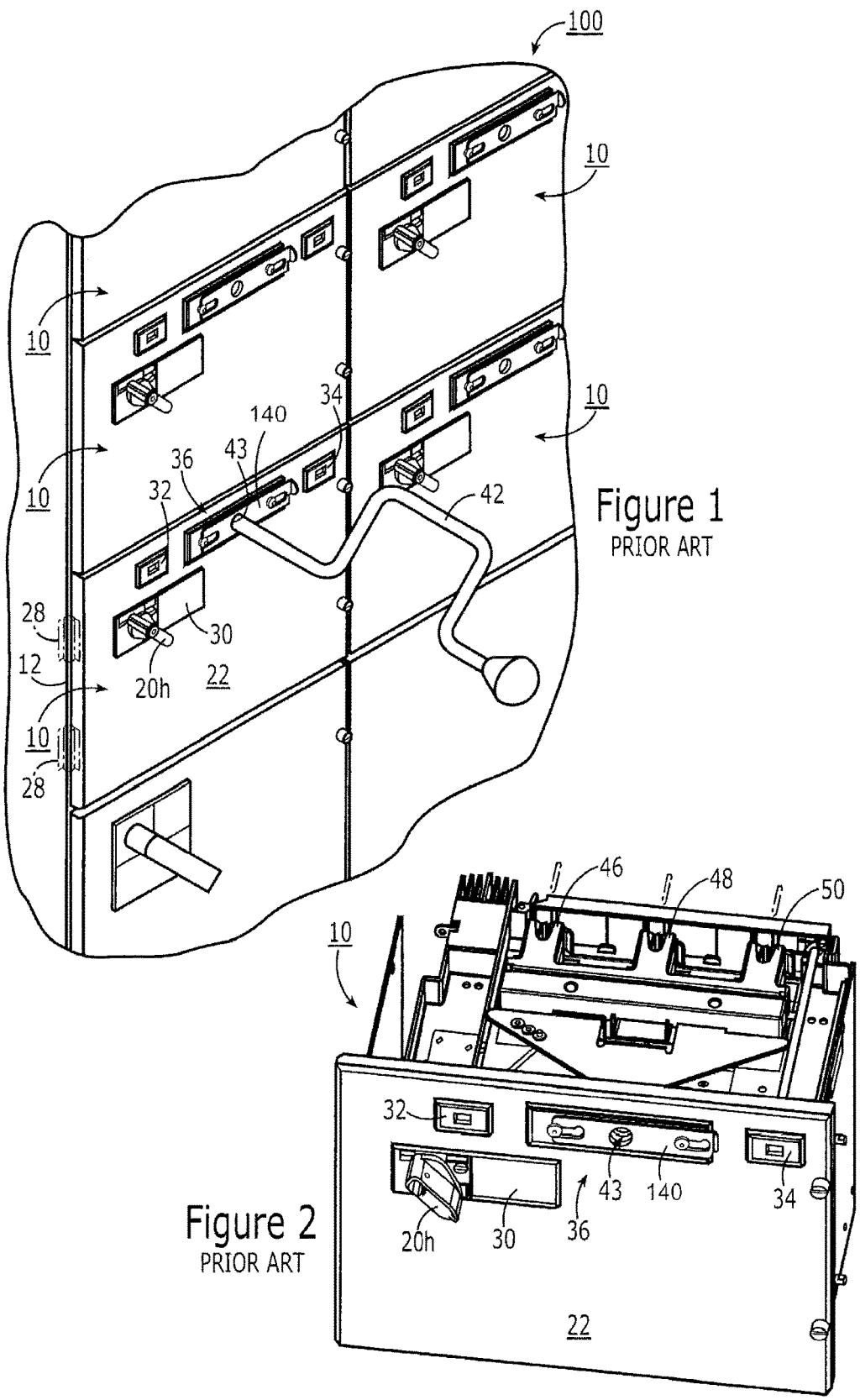

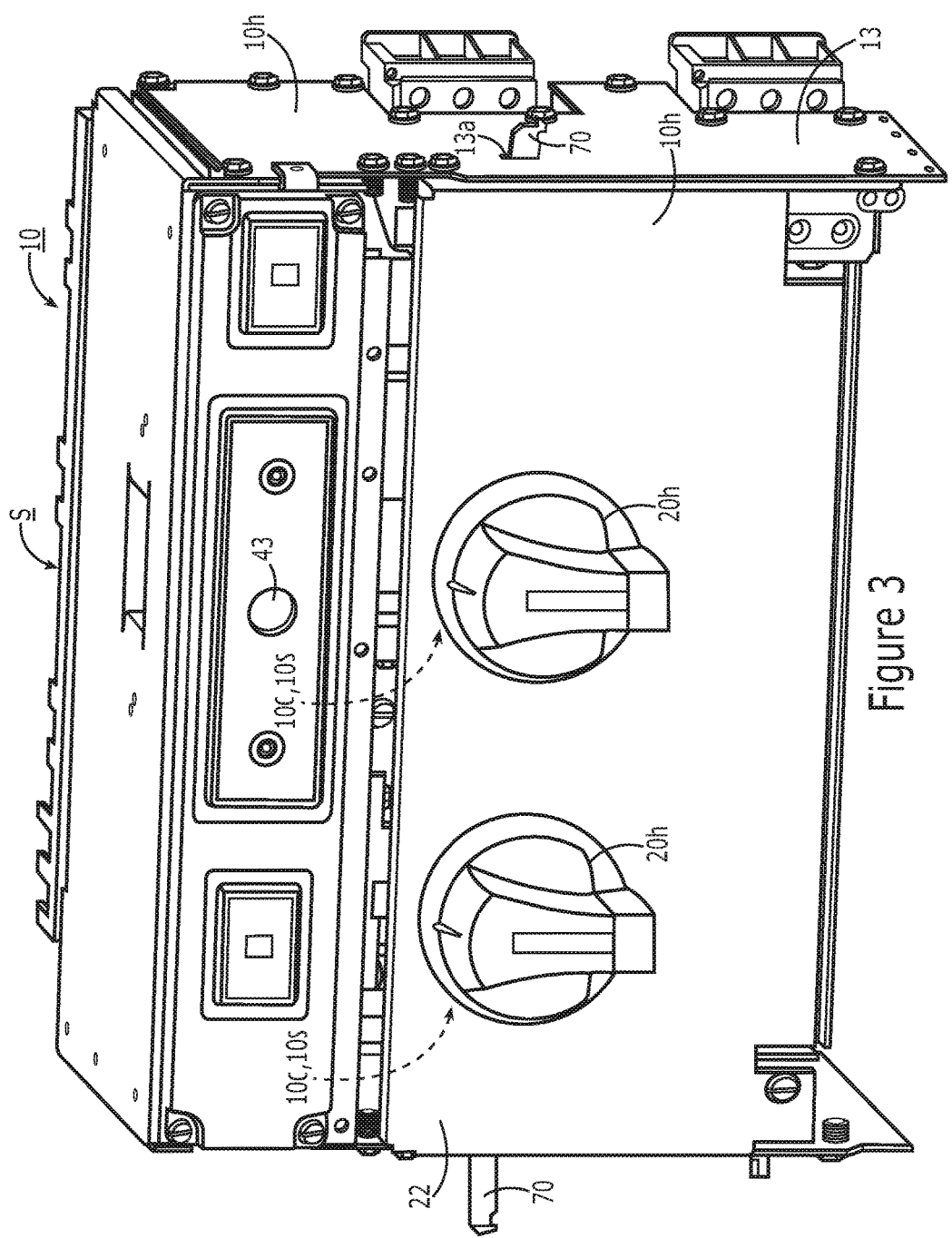

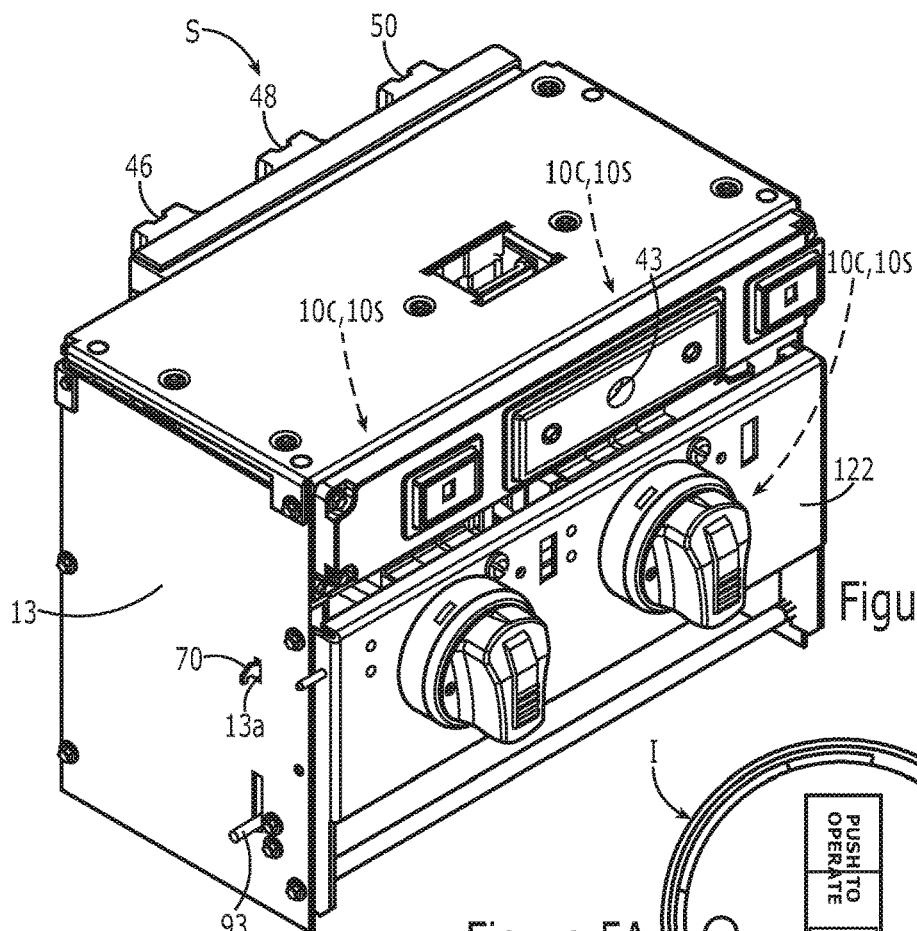
Figure 4
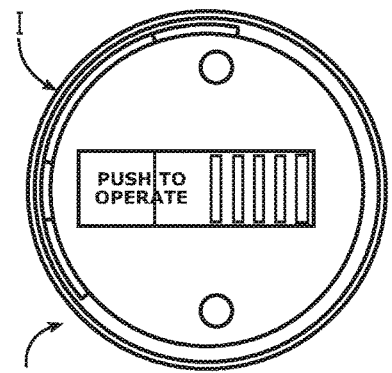
Figure 5A
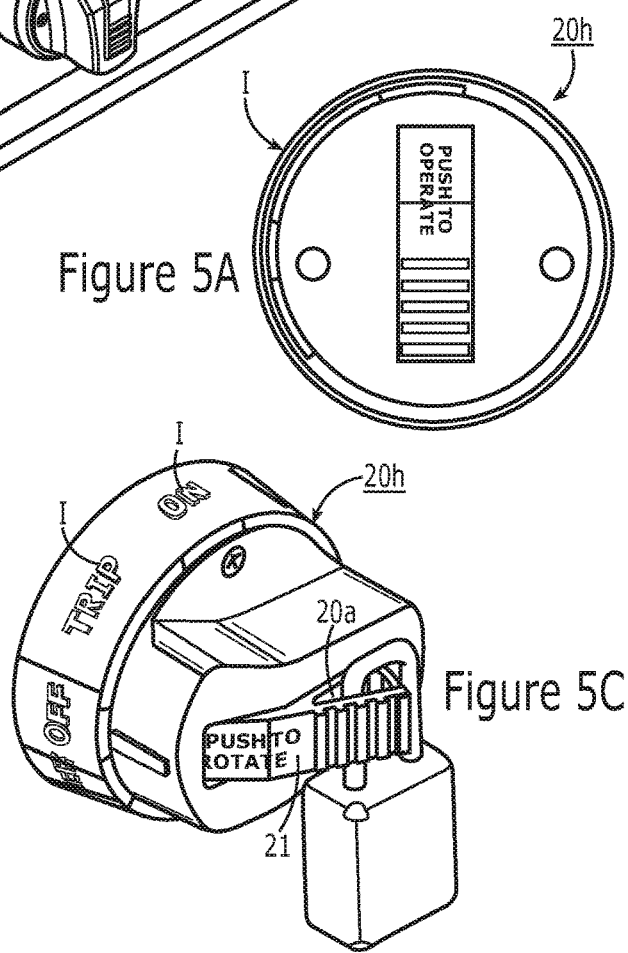
Figure 5B
Figure 5C

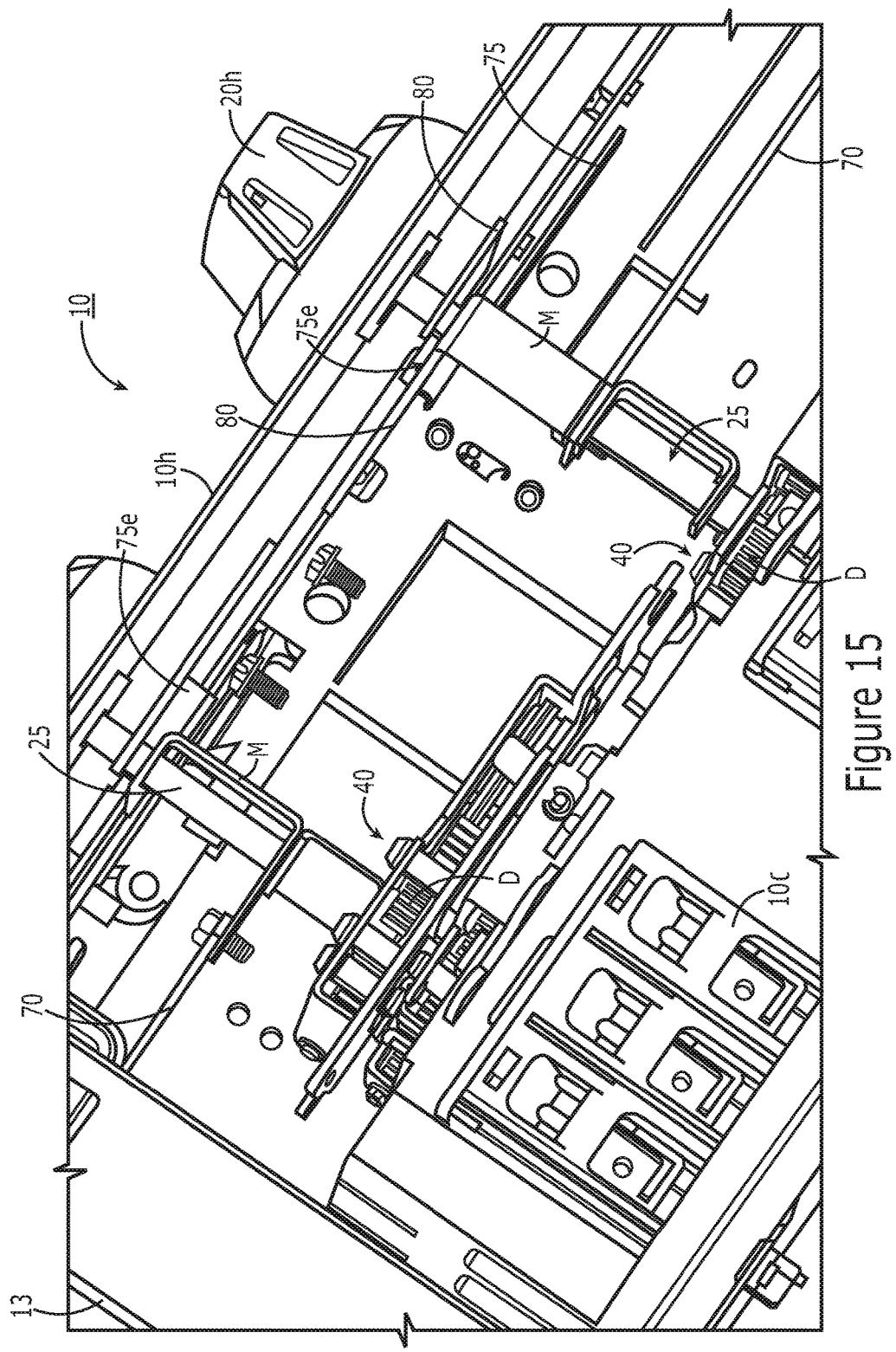

MOTOR CONTROL CENTER UNITS WITH RETRACTABLE STABS AND INTERLOCKS

RELATED APPLICATIONS

This application is a continuation of U.S. patent application Ser. No. 15/352,825 filed Nov. 16, 2016, which is a continuation of U.S. patent application Ser. No. 14/318,971 filed Jun. 30, 2014, now U.S. Pat. No. 9,531,169, issued Dec. 27, 2016, the contents of which are hereby incorporated by reference as if recited in full herein.

FIELD OF THE INVENTION

The present invention relates to motor control systems and more particularly to motor control center units.

BACKGROUND OF THE INVENTION

As is known to those of skill in the art, Motor Control Centers (MCC) can include cabinets or enclosures that hold multiple, typically modular, bucket assemblies of various sizes. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot or space in an MCC cabinet. The product is sold under the product name, Freedom 2100 MCC. See also, U.S. Patent Application Publication Serial Number US2013/0077210, the contents of which are hereby incorporated by reference as if recited in full herein.

Motor control centers are used, for example, in some commercial and industrial applications to distribute electrical power to a variety of loads (e.g., without limitation, relatively high power electrical motors, pumps, and other loads).

The bucket assemblies (also known as "buckets" or "units") can include handles that are disposed on the front door. The handle can be a rotary handle configured to convert the rotary motion of the rotary handle to the linear or translational motion of a circuit breaker linear action lever. See, e.g., U.S. Pat. Nos. 6,194,983 and 7,186,933, the contents of which are incorporated by reference as if recited in full herein. The handle is typically mounted parallel with the plane of the faceplate of the molded case circuit breaker, but spaced outwardly from it by the depth of the handle mechanism. Usually, a series of linkages are utilized to interconnect the rotary motion of the rotary handle to the linear motion of the circuit breaker handle or lever.

FIG. 1, for example, shows a portion of a prior art motor control center 100. The motor control center 100 includes a multi-compartment enclosure 12 for receiving a plurality of motor control units 10. Typically, each bucket 10 is a removable, pull-out unit that has a respective door 22 (which may be under a front panel). The door 22 is typically coupled to the housing 12 by hinges 28 (shown in phantom line drawing in FIG. 1) to permit access to motor control components of the bucket 10 while it is installed in the enclosure 12. For example and without limitation, the door 22 permits access to a circuit breaker assembly 30, a stab indicator 32, a shutter indicator 34, and a line contact actuator 36. When the bucket 10 is fully installed and electrically connected, a user-operator may operate a disconnect handle 20h. In a de-energized state of the motor control center 100, the user-operator may operate an isolation feature by moving a slide 140 and inserting crank 42 through an access portal or hole 43 in the door 22 to access the line contact actuator 36 to move a number of line contacts (see, for example, stab contacts 46,48,50 of the prior art bucket 10 of FIG. 2) to an isolated position out of (see FIG. 2) electrical contact with power lines or buses of the motor control center 100. Motor control centers and units therefore (also sometimes called "subunits") are described in greater detail, for example, in commonly assigned U.S. Patent Application Publications 2009/0086414, 2008/0258667, 2008/0023211 and 2008/0022673, which are hereby incorporated herein by reference.

Despite the above, there remains a need for alternate bucket configurations.

SUMMARY OF EMBODIMENTS OF THE INVENTION

Embodiments of the invention provide units with a sliding shutter to prevent access to a portal for an isolation feature which allows a user-operator to retract stabs in the units.

Embodiments of the invention provide buckets with portal shutters having separately, independently operative shutter movement for dual feeder units.

The shafts of operator mechanisms attached to a handle can be attached to interlocks that have a cam configured to slide a shutter to open and close access to an electrical portal associated with a retractable stab.

Embodiments of the invention are directed to bucket sub-assemblies configured to control access to a stab portal of a bucket unit. The sub-assemblies include first and second spaced apart operator disconnect handles, the first operator disconnect handle attached to a first inwardly extending shaft that holds a first cam, the second operator disconnect handle attached to a second inwardly extending shaft that holds a second cam. The first and second cams are configured to independently rotate. The first and second cams rotate in response to rotation of a corresponding operator disconnect handle. The sub-assemblies also include at least one shutter in communication with the first and second cams. The at least one shutter has a shutter portal and the at least one shutter is configured to cooperate with the first and second cams to laterally slide to a position that misaligns the shutter portal with a stab isolation portal to block access to the stab isolation portal when the first and/or second operator disconnect handle is in the ON position associated with conduction.

The first and second cams can each comprise first and second drive segments, one of which slides the at least one shutter one direction and one of which slides the at least one shutter in an opposite direction.

The drive segments can include arms that reside angularly apart between about 45-135 degrees.

The arms can extend straight out from the shaft and are orthogonal to each other.

The bucket sub-assemblies can include a front panel holding the first and second operator disconnect handles. The front panel can be a single panel or side-by-side dual sub-panels that are attached along inner short sides thereof to be able to pivot outward together. The single panel or dual sub-panels can be pivotably attached to a unit housing to pivot outward along a long axis associated with a long bottom side of the front panel.

The first and second operator disconnect handles can be right and left operator disconnect handles. The bucket sub-assemblies can include right and left interlock linkages. The right interlock linkage can include a link with one end portion attached to the first shaft and pivotably attached to a right lever at an opposing end portion. The left interlock linkage can include a link with one end attached to the second shaft at one end portion and pivotably attached to a left lever at an opposing end portion. The links can extend straight outward from respective first and second shafts. The right lever can have and end portion that is configured to extend out of a right sidewall of a unit housing when the right operator disconnect handle is in the ON position and the left lever can have an end portion that is configured to extend out of a left sidewall of the unit housing when the left operator disconnect handle is in the ON position.

The at least one shutter can be a single shutter. The first and second operator disconnect handles can be right and left operator disconnect handles. The right and left cams can be configured to slide the single shutter right and left independently of each other.

The at least one shutter can be a single shutter. The first and second cams can be configured to slide the single shutter independently of each other.

The first and second operator handles can be held by a front panel that is configured to pivot outward from hinges residing at a lower opposing long end portions thereof, and wherein the front panel engages a unit interlock to controllably lock and unlock the interlock to allow the pivoting movement only when there is non-conduction.

Other embodiments are directed to bucket assemblies. The bucket assemblies include a unit housing having a front panel and opposing laterally spaced apart sidewalls extend rearward of the front panel of the unit housing. The bucket assemblies also include a right operator disconnect handle on the front of the unit housing and attached to a right inwardly extending shaft. The right shaft holds a right cam configured to rotate in response to rotation of the right operator disconnect handle. The bucket assemblies also include a left operator disconnect handle on the front of the unit housing and attached to a left inwardly extending shaft. The left operator disconnect handle is laterally spaced apart from the right operator disconnect handle. The left shaft holds a left cam configured to rotate in response to rotation of the left operator disconnect handle. The bucket assemblies also include at least one shutter in communication with the right and/or left cam whereby the at least one shutter slides to the right and left in response to contact with the right and/or left cam. The bucket assemblies also include a stab isolation portal residing above the right and left shafts of the right and left operator disconnect handles. The at least one shutter has a shutter portal. The at least one shutter is configured to have a position that misaligns the shutter portal with the stab isolation portal to block access to the stab isolation portal when either of the right and left operator disconnect handles is in the ON position associated with conduction.

The at least one shutter is a single shutter and the right and left cams are configured to slide the single shutter independently of each other.

The bucket assemblies can also include a right interlock linkage attached to the right shaft and a left interlock linkage attached to the left shaft, each configured to rotate with respective right and left shafts.

The bucket assemblies can include a right feeder or starter held in the unit housing in communication with the right operator disconnect handle and a left feeder or starter held in the unit housing in communication with the left operator disconnect handle.

The cam can include arms that reside angularly apart between about 45-135 degrees.

The at least one shutter can include a single shutter or two adjacent shutters. The the single shutter or the two shutters can be configured with left and right cam followers residing on lower portions of the single shutter or on lower portions of the two shutters.

The bucket assemblies can include right and left interlock linkages, each with a link attached to a respective shaft at one end portion and pivotably attached to a lever at an opposing end portion. The link can extend straight outward from a respective shaft. The lever attached to the right shaft has an end portion that can be configured to extend out of a right sidewall of the bucket assembly when the right operator disconnect handle is in the ON position and the lever attached to the left shaft has an end portion that can be configured to extend out of a left sidewall of a unit housing of the bucket assembly when the left operator disconnect handle is in the ON position.

The front panel can be a single panel that extends between the sidewalls.

The front panel can be configured as two adjacent sub-panels that are attached at inner sides thereof to be able to pivot outwardly in concert along the long axis.

Still other embodiments are directed to a motor control center (MCC). The MCC includes a housing with first and second sidewalls defining an enclosure with a plurality of compartments. The compartments are configured to removably receive a plurality of units, at least one of the units includes: (a) a unit housing having a front and opposing laterally spaced apart sidewalls that extend rearward of the front of the unit housing; (b) at least one operator disconnect handle on the front of the housing and attached to an inwardly extending shaft, the shaft holds a cam configured to rotate in response to rotation of the operator disconnect handle, the cam includes first and second arms that extend straight out from the shaft and that reside angularly spaced apart between about 45-135 degrees; (c) at least one shutter in serial communication with the first and second arms of the cam whereby the at least one shutter slides right and left in response to a follower that contacts the first and second arms of the cam; and (d) a stab isolation portal residing above the shaft of the operator disconnect handle. The shutter has a shutter portal. The shutter is configured to have a position that misaligns the shutter portal with the stab isolation portal to block access to the stab isolation portal when the at least one operator disconnect handle is in the ON position associated with conduction.

The front of the unit housing can include a pilot panel segment or sub-panel holding a plurality of pilot devices laterally spaced apart from the at least one operator disconnect handle.

The at least one operator disconnect handle can include a right operator disconnect handle with a right shaft and right cam and a left operator disconnect handle with a left shaft and left cam. The right and left cams are configured to slide the at least one shutter right and left independently of each other.

The at least one operator handle can be held by a front panel attached to the unit housing. The front panel can be configured to pivot outward from hinges residing at a lower opposing long end portions thereof. The front panel engages a unit interlock attached to the unit housing to controllably lock and unlock the front panel to allow the pivoting movement only when there is non-conduction.

Other embodiments include methods of controlling access to a stab isolation portal of a bucket. The methods include rotating an externally accessible operator disconnect handle of a bucket or unit to an ON position, the operator disconnect handle attached to an inwardly extending shaft, the shaft holding a laterally outwardly extending interlock linkage and a cam. In response to the rotation of the operator disconnect handle, (i) an outer end portion of the interlock linkage extends out through an aperture in a sidewall of the bucket or unit and (ii) the cam forces a shutter to slide left or right to block access to a stab isolation access portal associated with a retractable stab.

The bucket can be a dual feeder or starter bucket with right and left operator disconnect handles, each having respective shafts with the cam and interlock linkage. The rotating can be carried out so that the cams of each shaft move the shutter independently of the other and are configured to slide the shutter to a position that blocks access to the stab isolation access portal unless both the right and left operator handles are in an OFF position associated with non-conduction.

Still other embodiments are directed to bucket assemblies. The assemblies include: a unit housing; and a front panel holding either (i) first and second operator disconnect handles or (ii) at least one operator disconnect handle with a pilot panel. The front panel is a single panel or side-by-side dual sub-panels that are attached along inner short sides thereof to be able to pivot outward together. The single panel or dual sub-panels are pivotably attached to the unit housing to pivot outward along a long axis associated with a long bottom side of the front panel. The front panel engages a unit interlock attached to the unit housing to controllably lock and unlock the front panel to allow the pivoting movement away from the unit housing only when there is non-conduction.

The first and second operator disconnect handles are right and left operator disconnect handles. The bucket sub-assembly can include right and left interlock linkages, the right interlock linkage comprising a link with one end portion attached to the first shaft and pivotably attached to a right lever at an opposing end portion and the left interlock linkage comprising a link with one end attached to the second shaft at one end portion and pivotably attached to a left lever at an opposing end portion. The links extend straight outward from respective first and second shafts. The right lever has an end portion that is configured to extend out of a right sidewall of a unit housing of a bucket assembly when the right operator disconnect handle is in the ON position and the left lever has an end portion that is configured to extend out of a left sidewall of a unit housing of a bucket assembly when the left operator disconnect handle is in the ON position.

Still other embodiments are directed to a bucket assembly that includes: (a) a unit housing having a front and opposing laterally spaced apart sidewalls extend rearward of the front of the unit housing; (b) at least one operator disconnect handle on the front of the unit housing and attached to an inwardly extending shaft, the shaft holds (i) at least one cam configured to rotate in response to rotation of a respective operator disconnect handle and (ii) an interlock linkage that pivots as the shaft rotates to extend a sufficient distance to extend through an aperture in the sidewall of the unit housing and retract to be inside the unit housing; (c) at least one shutter in communication with the at least one cam whereby the at least one shutter slides to the right and left in response to contact with the cam; and (d) a stab isolation portal residing above the shaft of the at least one operator disconnect handle. The at least one shutter has a shutter portal. The at least one shutter is configured to have a position that misaligns the shutter portal with the stab isolation portal to block access to the stab isolation portal when the at least one operator disconnect handle is in the ON position associated with conduction.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 1 is a partial front perspective view of an exemplary prior art Motor Control Center (MCC).

FIG. 2 is a top perspective view of an example of a prior art unit of the MCC.

FIG. 3 is a front perspective view of an exemplary unit with a dual feeder configuration according to embodiments of the present invention.

FIG. 4 is a left side perspective view of another exemplary unit with a dual feeder configuration according to embodiments of the present invention.

FIGS. 5A and 5B are front views of exemplary "ON" (FIG. 5A) and "OFF" (FIG. 5B) operational positions of the handle shown in FIG. 4 for the associated internal disconnect according to embodiments of the invention.

FIG. 5C is a front perspective view of the handle shown in FIGS. 5A and 5B illustrating an extended lockable configuration according to embodiments of the present invention.

FIG. 15 is a bottom perspective view of internal components of an exemplary unit according to embodiments of the present invention.

DETAILED DESCRIPTION OF EMBODIMENTS OF THE INVENTION

Figure 6:
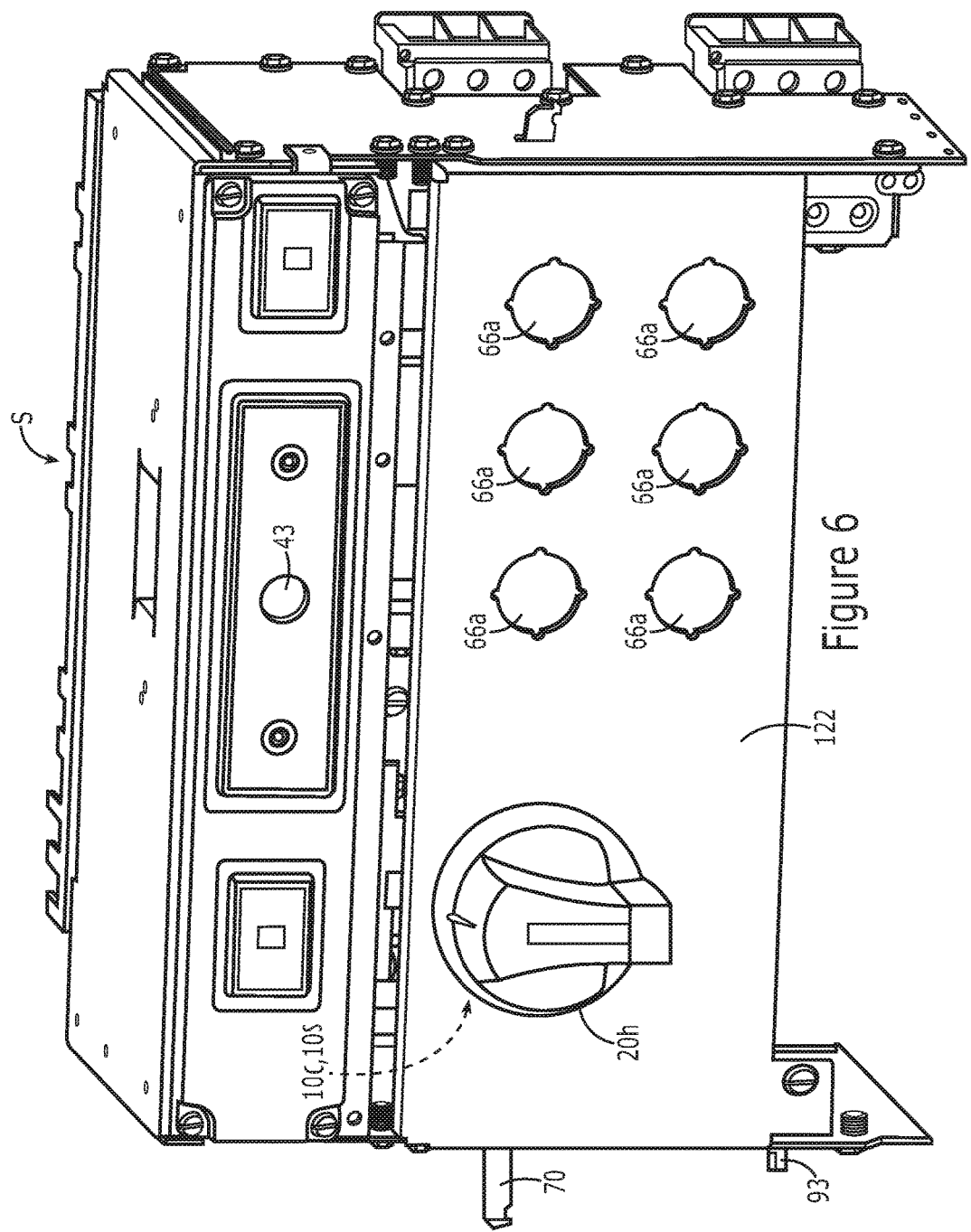
FIG. 6 is a front perspective view of yet another exemplary unit with a rotary disconnect on one side and a plurality of control devices on the other side according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In the present disclosure, the terms "bucket" or "unit" are used interchangeably and are intended to mean a motor control center unit that may be configured to be a removable modular unit capable of being installed behind individual or combined sealed doors on the motor control center enclosure. The unit may contain various motor control and motor protection components such as motor controllers, starters, contactor assemblies, overload relays, circuit breakers, motor circuit protectors, various disconnects, and similar devices for electric motors. The unit is configured to connect to a common power bus of the motor control center and conduct supply power to the line side of the motor control devices for operation of motors or feeder circuits.

As discussed before, units may be configured as "starter units" for supplying power controlling electrical motors and pumps or as general "feeder units" for supplying feeder circuits. The terms "bucket assembly", "bucket" and "unit" are used interchangeably and refer to a structure (typically having sides of a protective metal shell) that contains either a switch with a fuse or a circuit breaker for turning power ON and OFF to a motor, or feeder circuit, typically for controlling power to motor starters. As noted above, the bucket or unit can be a feeder unit or a starter unit. The bucket can include other components such as a power transformer, a motor starter to control a single motor and PLCs (programmable logic controllers), drives and the like. The bucket can be configured as a modular device to allow the internal components to be assembled as a unit that can be easily installed into a Motor Control Center (MCC) compartment. As is well known, the bucket 10 can have a bus grid with "power stabs" 46, 48, 50 (FIG. 4) in the back that connect to bus bars that carry power (current) to the compartments of a vertical section in an MCC cabinet 100 (FIG. 1). The bus bars are connected to larger horizontal bus bars that bring power to the vertical sections. The horizontal bus bars are usually in the top, but some MCC designs may have them in the center or bottom.

A "feeder unit" refers to a motor control center unit for supplying feeder circuits. A feeder unit may have one or more feeders or power supply lines to supply feeder circuits or devices. A feeder unit (also called a "feeder") can have a "line side", which refers to the side of the feeder configured to be directly or indirectly connected to the common power bus of the motor control center. A feeder can also have a "load side", which refers to the side of the feeder configured to be connected to and deliver current to a feeder circuit. A feeder may comprise a circuit breaker, a fuse and disconnect switch, or another configuration. The terms "feeder circuit" and "feeder device" are used interchangeably and are intended to mean circuits or devices connected to feeder units or "feeders".

A "circuit breaker", "breaker", "molded case circuit breaker", or "MCCB" is a device designed to open and close a circuit, typically allowing both manual open and close operation and automatic circuit interruption, the latter to open a circuit under certain conditions, e.g., an over-current. The circuit breaker can be for a motor starter unit or feeder unit, for example.

The terms "motor", "load", and "load device" are used interchangeably and are intended to mean devices bearing electrical load that are connected to and controlled by the motor control center. Load devices are typically motors but may also be pumps or other machinery that may comprise motors or pumps. Load devices may be connected to starter units.

The terms "operating mechanism" and "operator mechanism" are used interchangeably and refer to an assembly for opening and closing separable main contacts in a circuit breaker or for turning power ON and OFF using a switch associated with a fuse as a disconnect.

MCCs usually have a wire way for wires from respective units 10 to the motors and other loads and control wires. U.S. Patent Application Publication 2013/0077210 describes an MCC with both right and left side wireways, the contents of which are hereby incorporated by reference as if recited in full herein. The wireways are typically provided as an enclosed space in an MCC cabinet proximate but outside stacked units. MCCs can be configured in many ways. Each compartment can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors or feeder circuits. Several may be powered from main switchgear which, in turn, gets its power from a transformer attached to the incoming line from the power company. A typical MCC cabinet is an enclosure with a number of small doors arranged in rows and columns along the front. The back and sides are typically flat and mostly featureless. The buckets can be provided in varying sizes. For starter units, the size can be based on the size of the motor they are controlling. The bucket assembly can be configured to be relatively easily removable for repair, service or replacement. MCCs can have regular starters, reversing starters, soft start, and variable frequency drives. MCCs can be configured so that sections can be added for expansion if needed. The buckets or units 10 of a motor control center 100 can have the same or different configurations.

The terms "right side" and "left side" refer when the unit or MCC is viewed from the front, e.g., the front is associated with the unit 10 orientation shown in FIGS. 3 and 4, for example, with handles 20*h* facing forward as shown in FIGS. 3 and 4. While the handles 20*h* are shown as rotary handles, other handle configurations may be used, including, for example, push handles, levers and linearly moveable handles. It is also noted that the dual feed configurations are shown as side by side arrangements, but it is contemplated that vertically aligned handles may also or alternatively be used with the respective disconnects placed in the unit accordingly.

The term "compact" refers to units 10 held in a condensed configuration (package) relative to conventional units/buckets. The MCC structure or cabinet 100 (FIG. 1) can be designed to receive multiple bucket units 10 ranging in various defined sizes. The units 10 can be provided in package or frame sizes of about 6 inches to about 72 inches (tall) with substantially common depth and width dimensions, known as 1× (6 inches) to 12× (72 inches) sizes. The sizes can be in single X increments, from 1×, 2×, 3×, 4×, 5×, 6×, 7×, 8×, 9×, 10×, 11× and 12×. Thus, a 5×MCC unit 10 can be about 30 inches tall. The frame sizes can be provided for a plurality of amperages, including a plurality of: 125 A, 150 A, 225 A, 250 A, 400 A, 600 A, 1200 A and 2000 A, for example. A unit 10 is typically about 7 inches deep but larger or smaller sizes may be appropriate in some embodiments.

Figure 10:
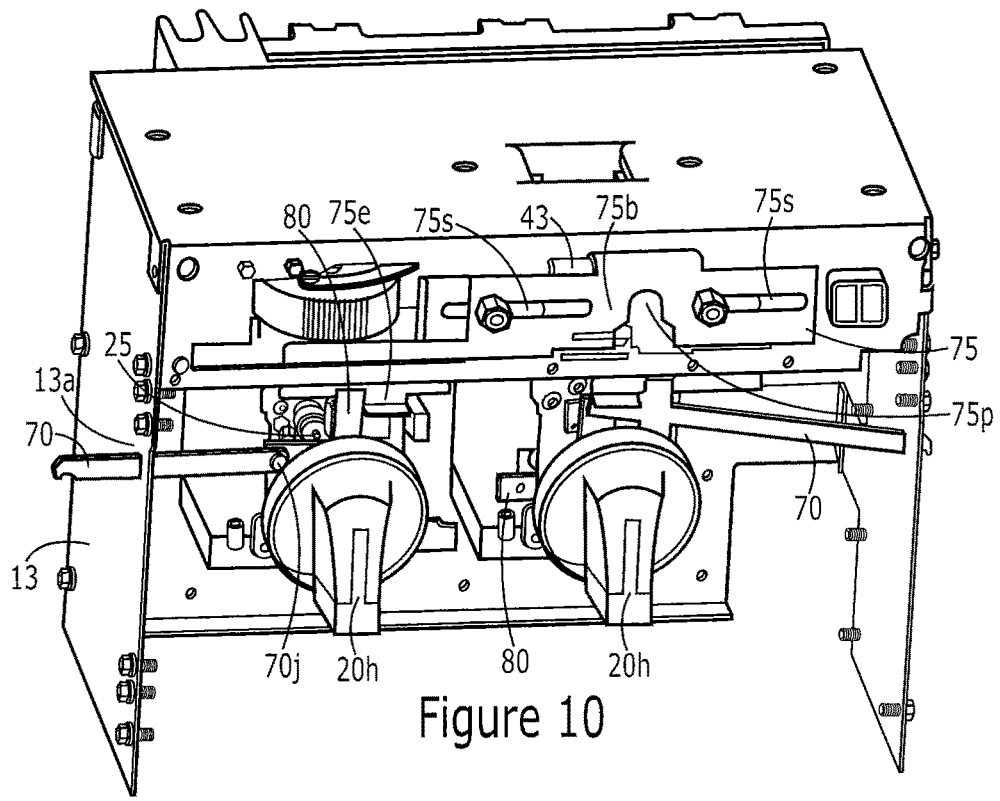
FIG. 10 is a front perspective view of an exemplary unit shown with the external cover over the racking (stab isolation) portal omitted to illustrate a sliding shutter that overlies the racking portal and that cooperates with an interlock mechanism according to embodiments of the present invention.

Referring now to FIGS. 3 and 4, in some embodiments, the bucket assembly or unit 10 has a dual feeder and/or starter configuration. For the embodiments shown in FIGS. 3 and 4, the dual feeder and/or starter unit 10 includes respective right and left handles 20*h* attached to a respective shaft 25 of a corresponding disconnect D such as a disconnect operator mechanism 40 (FIG. 10). The bucket assembly 10 can be configured for DC (direct current) or AC (alternating current) operation. The bucket assembly 10 can include a front cover 11 (FIG. 6) residing over the door 22 or panel holding the handle 20*h*. The bucket assembly 10 can have a metal enclosure, frame or housing 12 with sidewalls 13.

In some embodiments, the bucket assembly 10 can comprise a molded case circuit breaker 10C. Molded case circuit breakers are well known to those of skill in the art, as exemplified by U.S. Pat. Nos. 4,503,408 and 5,910,760, the contents of which are incorporated herein by reference as if recited in full herein. In other embodiments, the bucket assembly 10 can be configured to house a fused disconnect switch to turn power on and off. In some embodiments, the MCC cabinet 100 (FIG. 1) can hold both a fused disconnect switch and circuit breaker type units 10 and each can have a standardized rotary handle 20*h* that controls the internal components for power on/off operation.

As shown in FIGS. 3 and 4, the unit 10 includes two (typically side-by-side) operator handles 20*h* that individually communicate with respective internal disconnect and/or operator mechanisms 40 (FIG. 19) that, in turn, connect to an internal circuit breaker 10C or a disconnect switch 10S, respectively. The handles 20*h* can be rotary handles. FIGS. 3 and 4 also illustrate interlock linkages 70 that extend through respective left and right side apertures 13*a* in the sidewalls 13 of the unit.

Figure 7:
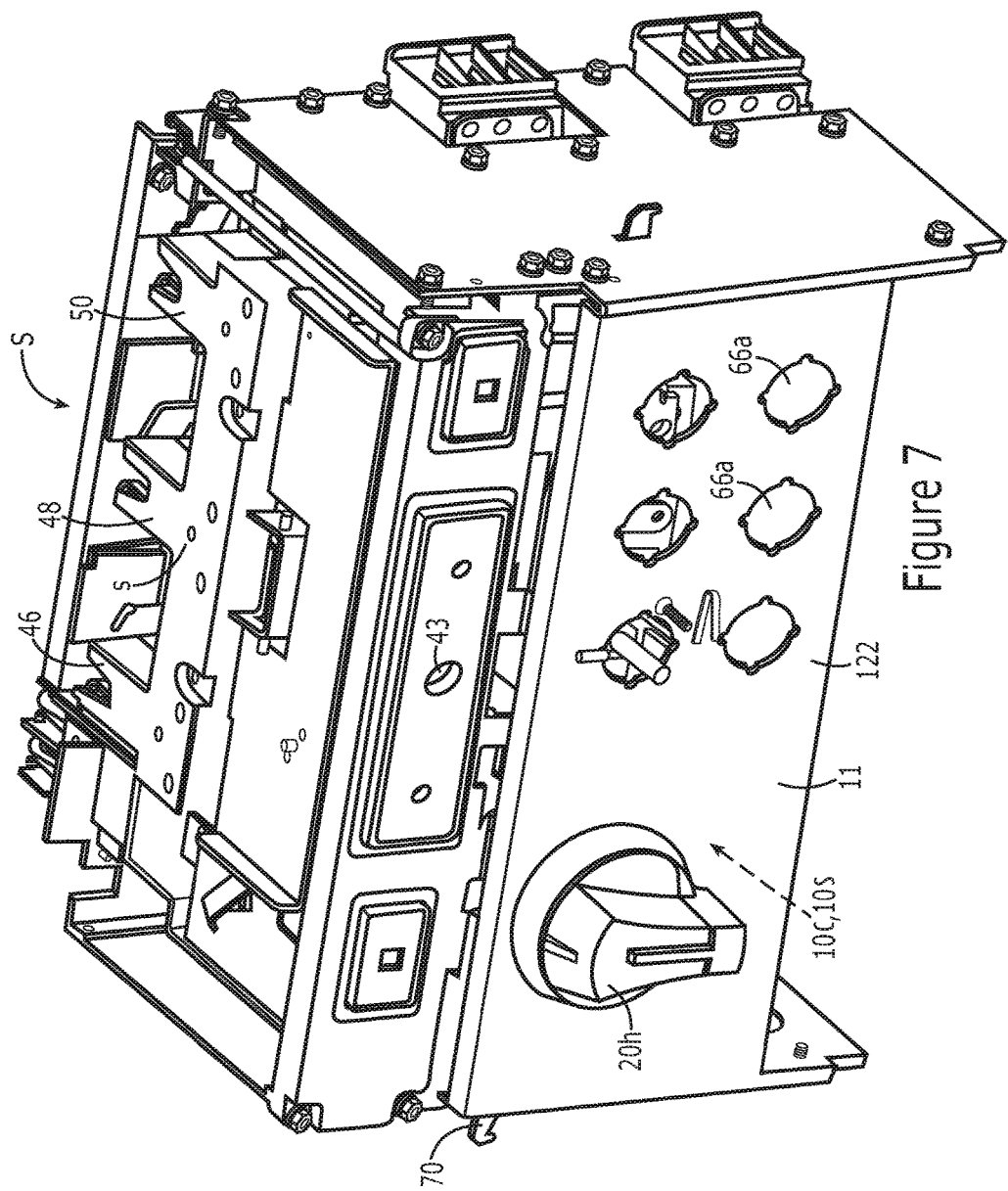
FIG. 7 is a front perspective view of the unit shown in FIG. 6 without the top cover illustrating a retractable stab configuration and portal interlock according to embodiments of the present invention.

The unit 10 can be configured so that the stab S is offset to reside closer to one side of the unit, e.g., so that a left side stab 46 or right side stab 50 (and/or the center stab 48) is closer to a respective left or right side of the unit 10. FIGS. 4 and 7 show the center stab 48 as residing closer to the right side of the unit 10, according to some embodiments.

FIGS. 3, 4, 6, 7 and 8 illustrate that the unit 10 has a stab isolating portal 43 residing above the handle 20*h* (FIG. 6-8) or handles 20*h* (FIGS. 3 and 4). The top cover of the unit 10 is not shown in FIG. 7 to more clearly illustrate the retractable stab S.

FIG. 3 illustrates one example of tandem rotary handles 20*h* while FIG. 4 illustrates another exemplary embodiment of tandem rotary handles 20*h*. FIG. 5A illustrates an exemplary "ON" orientation/position of the handle 20*h* while FIG. 5B illustrates an exemplary "OFF" position. Thus, in operation, the pre-defined orientation of the rotary handle 20*h* with respect to operation status can provide a visual indication to a user-operator of the conduction status of the disconnect d, e.g., breaker 10C or switch disconnect 10S (optionally with a fuse) being ON/OFF.

The term "ON" with respect to handle position/orientation refers to the associated feeder or starter of the unit 10 having conduction with the operator disconnect closed (circuit breaker closed or fused switch being ON/switch closed). The term "OFF" with respect to handle position/orientation refers to the associated feeder or starter of the unit 10 having no conduction with the disconnect open (circuit breaker open or disconnect switch OFF/switch open).

In some embodiments, if the handle 20*h* is in a generally horizontal position, i.e., with the center lever 21 straight across the front of the circuit breaker as shown in FIG. 5B, this orientation can be the OFF position and can be visually used as an indication that the contacts of the circuit breaker are open and that current is blocked. If the handle 20*h* is rotated from the orientation shown in FIG. 5A, e.g., rotated 90 degrees (typically clockwise from the orientation in FIG. 5B), then an indication is given that the circuit contacts are closed. Where the unit 10 includes a breaker 10C, the breaker trip position can be at about 45 degrees mid-point between ON and OFF. However, as noted above, the handles 20*h* may have other configurations and are not required to be rotating handles and may use other angular orientations for ON and/or OFF.

The embodiment shown in FIG. 4 can be configured to have a "push" to pop out configuration as shown in FIG. 5C whereby an aperture 20*a* is exposed to allow a physical lock to be attached to an end of an arm 21 of the handle 20*h*. For further description of this exemplary handle configuration, see, U.S. patent application Ser. No. 14/174,481, now published as U.S. Patent Application Publication number US 2015/0221458, the contents of which are hereby incorporated by reference as if recited in full herein.

Figure 8:
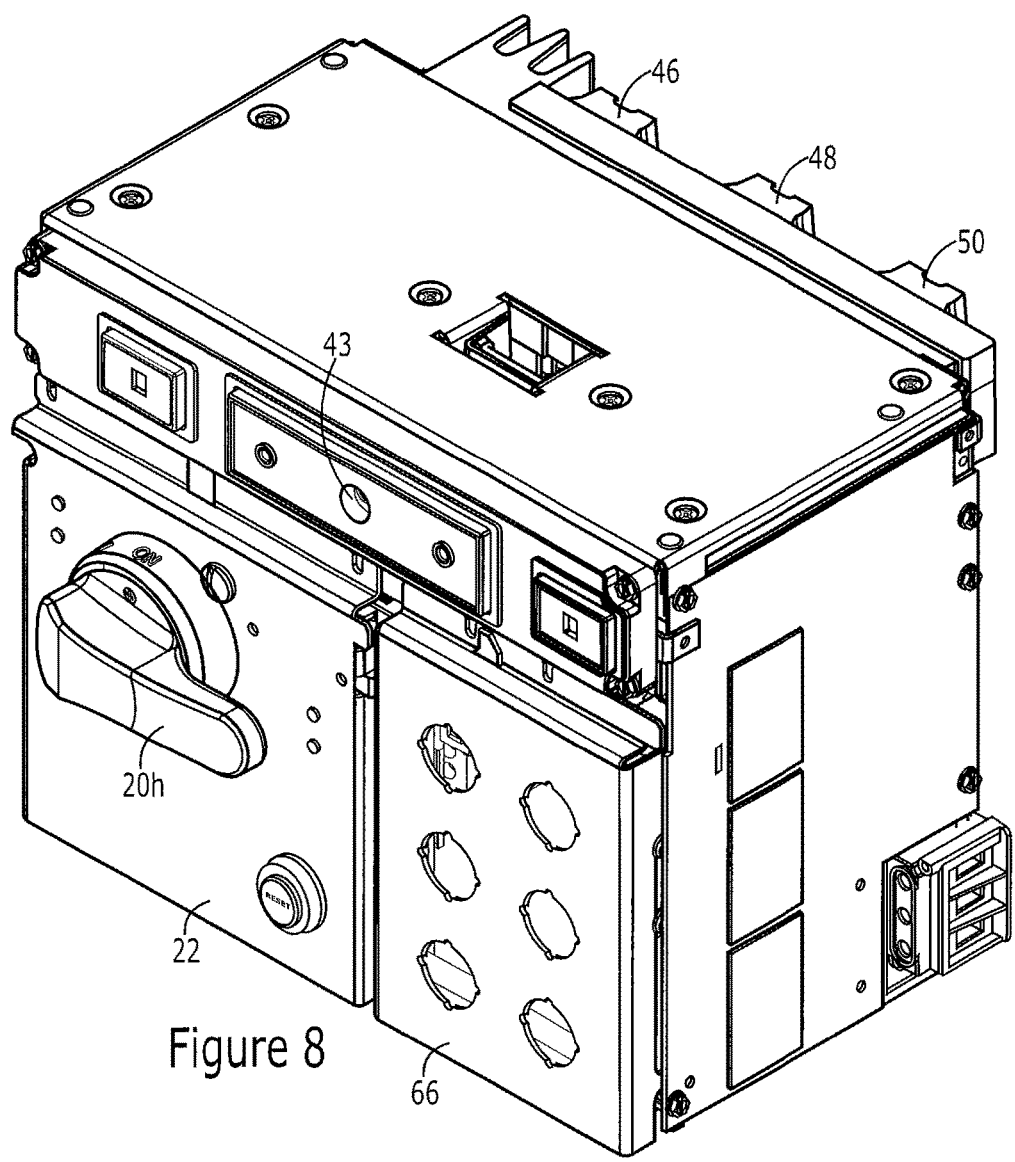
FIG. 8 is a front perspective view of a unit similar to that shown in FIG. 6, but with a different handle and control device panel layout according to embodiments of the present invention.

FIG. 8 illustrates a long handle version of a handle 20*h* which can provide additional torque control for some applications. An intermediate length handle may also be used for some embodiments (not shown).

Figure 9:
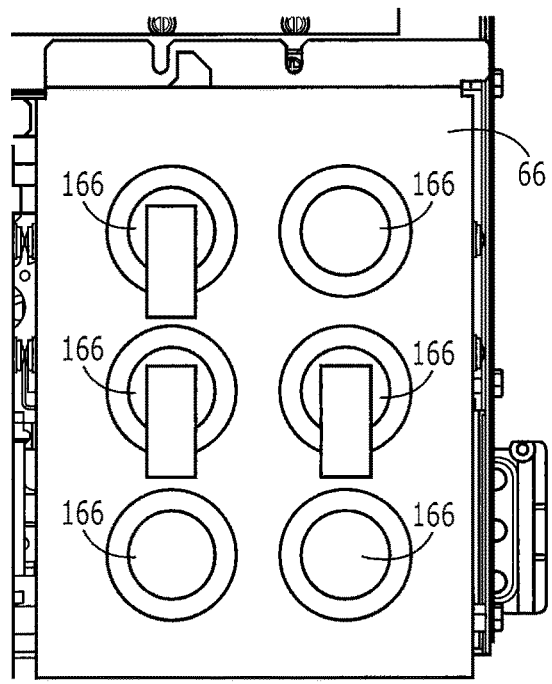
FIG. 9 illustrates examples of a device panel for different pilot control items which can vary by product and/or customer according to embodiments of the present invention.

FIGS. 6-8 illustrate units 10 with a single handle 20*h* adjacent a device or "pilot" device panel 66 configured with apertures 66*a* to receive various control input members and/or indicating light devices 166 (FIG. 9). The devices 166 can include pilot control devices, indicating lights, user inputs such as push buttons and/or selector switches and the like. There are many different variations that can be used as is well known to those of skill in the art. While six devices 166 and respective holding or receiving apertures 66*a* are shown, the device panel 66 can be configured with more or less apertures 66*a* and hold more or less control input members and/or indicating lights, for example.

The unit 10 can have a single continuous length panel 122 that holds both the handle 20*h* and the device panel apertures 66*a* as shown in FIGS. 6 and 7. The unit 10 can be configured with the door 22 as a subpanel adjacent the separate/discrete device panel 66 as shown in FIG. 8. Either embodiment may optionally be configured to engage one or more unit interlocks 93 (FIGS. 6, 18) and may pivot outward from a bottom edge thereof as will be discussed further below.

Figure 11:
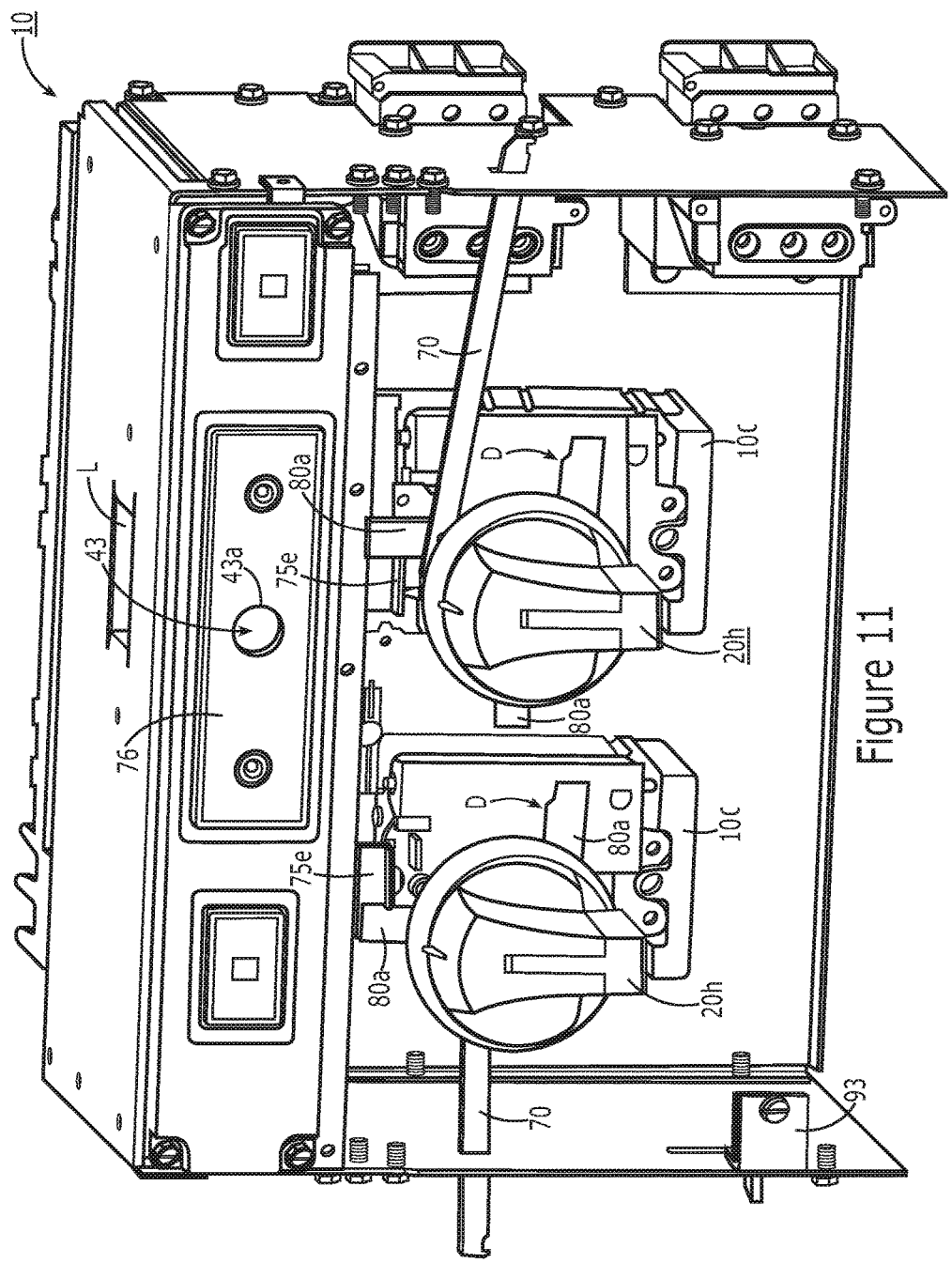
FIG. 11 is a front view perspective view of a unit with a dual feeder configuration as shown in FIG. 3, but with the front cover/panels omitted to illustrate exemplary interlocks according to embodiments of the present invention.

FIG. 10 illustrates that the unit 10 can have at least one laterally slidable shutter 75 with a portal 75*p*. The shutter 75 can have slots 75*s*. When the portal 75*p* is aligned with the isolation portal 43, external access to the portal 43 is allowed. When the portal of the shutter 75*p* is left or right of the portal 43, the shutter body 75*b* resides over and blocks the portal 43. FIG. 11 illustrates that the shutter 75 can reside behind a panel 76 with an aperture 43*a* aligned with the access portal 43. FIGS. 10 and 11 also illustrate that the unit 10 can have a FLASHGARD interlock L typically via the top surface of the unit.

Figure 19:
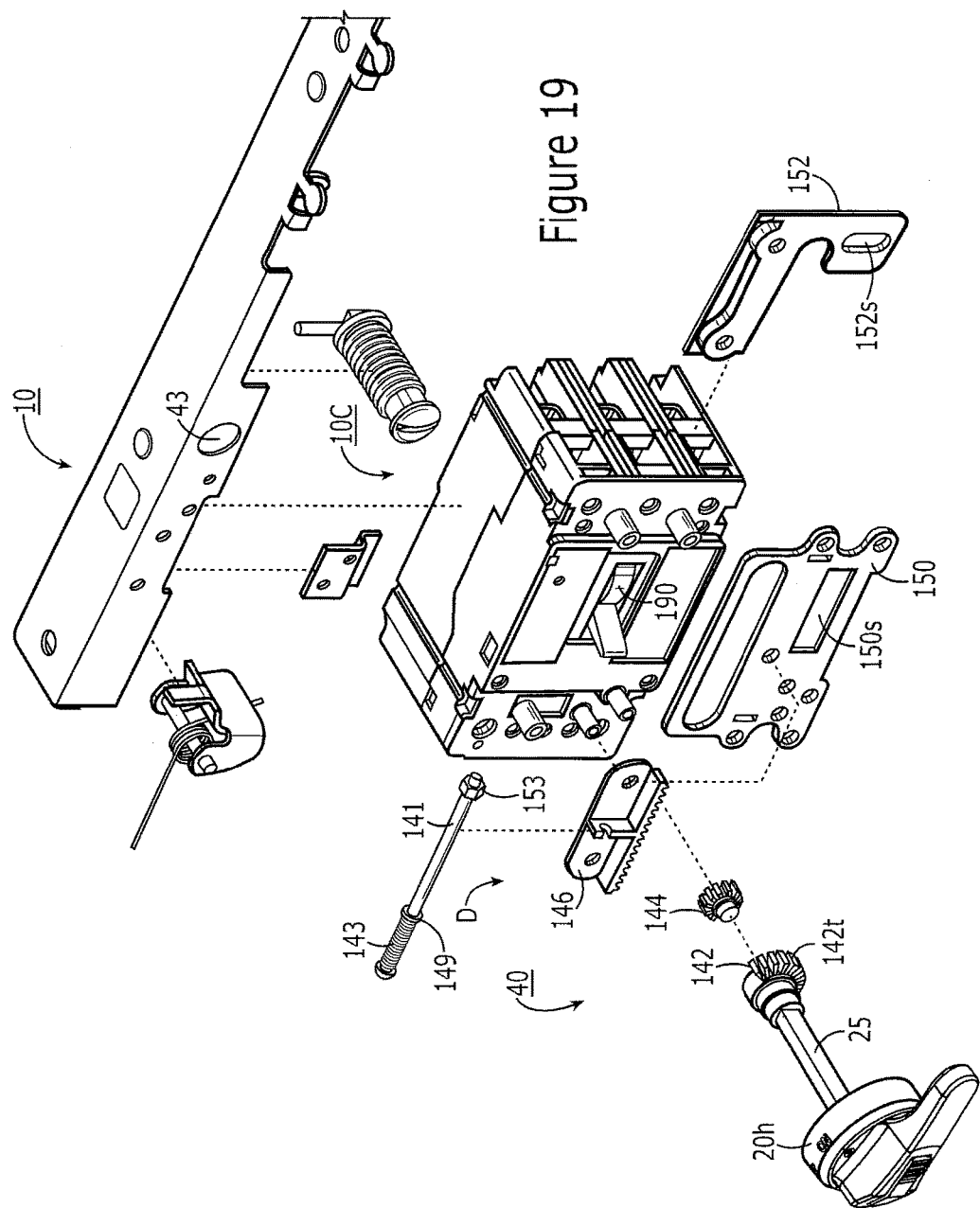
FIG. 19 is a partial exploded view of an exemplary unit illustrating components of an exemplary operator mechanism and fuse system according to some embodiments of the present invention.

As shown by FIG. 10 and FIGS. 12A, 12B, 13A, 13B, for example, the operator handle 20*h* can be attached to an inwardly extending shaft 25. The shaft 25 can hold the interlock linkage 70 and at least one cam 80. The shaft 25 can be part of the operator disconnect mechanism D, 40 (FIG. 19, for example). Each of the right and left side cams 80 can be configured to move the at least one shutter 75 both right to left and left to right.

Referring to FIGS. 12A, 12B, 13A, 13B, in some embodiments, each of the cams 80 can be configured to engage a single shutter 75 that is slid left when each handle 20*h* is in the OFF position to open the shutter portal 43 by aligning portal 75*p* and is slid right when each handle 20*h* is in the ON position to block access to the portal 43 in response to the position of the handle 20*h*.

In some embodiments, the cam 80 can reside closer the front of the unit 10, e.g., closer to the handle 20*h* than the linkage 70. The cam 80 can have a plurality of radially-outwardly extending, circumferentially spaced apart arms 80*a* (also referred to as $80a_1$, $80a_2$). The term "circumferentially" is used broadly to describe spacing about the shaft 25, recognizing that the shaft 25 may have a non-circular shape. At least one of the arms 80*a* pushes the at least one shutter 75 to slide left and at least a different other at least one pushes the at least one shutter 75 to slide right. The cam 80 may have a curvilinear cam profile, e.g., with a curvature configured with outer lobes and a valley(s) rather than or in addition to the straight arms 80*a* to control movement of the at least one shutter 75 (not shown).

Figure 12A:
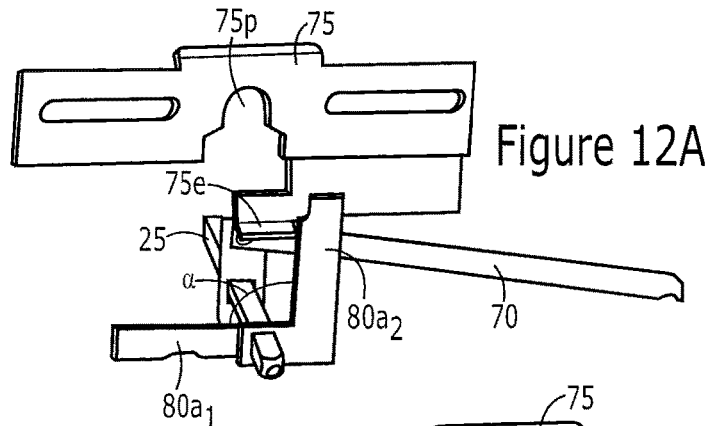
FIG. 12A is a front perspective view of an exemplary right hand linkage, illustrating the configuration of the linkage when the handle is in an OFF position according to embodiments of the present invention.

In some embodiments, the angular spacing α between the cam arms 80*a* on a respective shaft 25 can be between about 45-135 degrees, typically about 90 degrees. In some embodiments, the arms 80*a* are orthogonal to each other as shown in FIG. 12A. The angular spacing can substantially correspond with the angular spacing between ON and OFF for a respective handle 20*h* orientation.

The shutter 75 can have a lower portion 75*e* that can contact the cam 80 when the handle 20*h* is in the defined positions to move into the appropriate aligned position: (i) with the shutter portal 75*p* aligned with the portal 43 to open the access portal 43 or a misaligned position and (ii) with the shutter portal 75p laterally offset from the portal 43 to block portal 43 access.

The lower portion 75e can be referred to as a "cam follower". The cam follower 75e moves linearly and is not required to always be in contact with the cam 80. In some embodiments, the cam 80 is configured so that in the ON position, one arm contacts the cam follower 75e and in the OFF position, the other arm contacts the cam follower. The cam follower 75e may extend outwardly away from a plane associated with the shutter primary body, typically horizontally. The cam follower may extend substantially horizontally toward the front of the unit 10 or substantially horizontally toward the rear of the unit 10 and may have a different configuration. The cam follower 75e can comprise a horizontally extending protrusion or ledge that can provide assembly tolerance so as to be able to consistently engage the drive portion of a respective cam 80 held on the shaft 25 despite build tolerances. The lateral stroke distance of the shutter 75 and/or lower portion of the shutter 75e in each direction, right to left and/or left to right to open/close the access path to the portal 43 can be between about 0.25 inches to about 3 inches, more typically between about 1 inch to about 2 inches.

The cam 80 can be provided as a monolithic single piece body or may be provided as discrete closely spaced components held by the shaft 25 in a proper orientation to cause the respective sliding left and right lateral movement of the shutter 75.

The linkage 70 can pivotably attached to a short outwardly extending link 71 via joint 70j with the link 71 being shorter than the lever arm 72 of the linkage 70 (FIGS. 12B, 13B) and is typically shorter than the cam arms 80a. The linkage 70 is typically fully extended (horizontal or substantially horizontal) in the ON position (FIG. 12B, 13B) to extend out of the sidewall 13 and is retracted so as to be pivoted downward or upward in the OFF position (FIG. 12A).

Figure 12B:
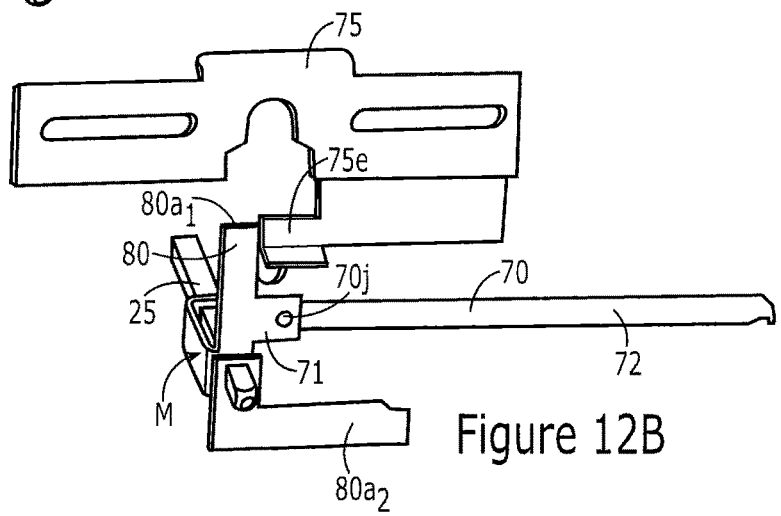
FIG. 12B is a front perspective view of the exemplary right hand linkage, illustrating the configuration of the linkage when the handle is in an ON position according to embodiments of the present invention.
Figure 13A:
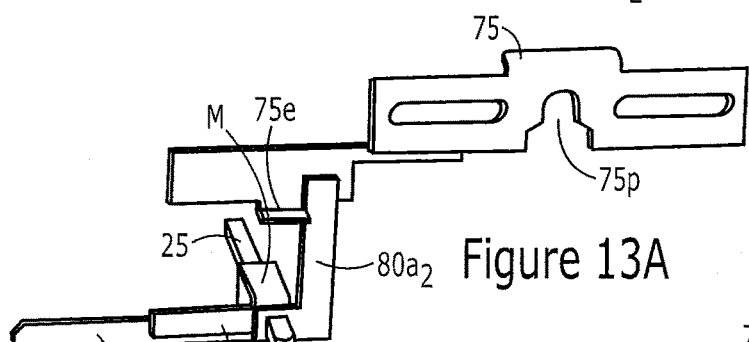
FIG. 13A is a front perspective view of an exemplary left hand breaker linkage, illustrating the configuration of the linkage when the handle is in an OFF position according to embodiments of the present invention.
Figure 13B:
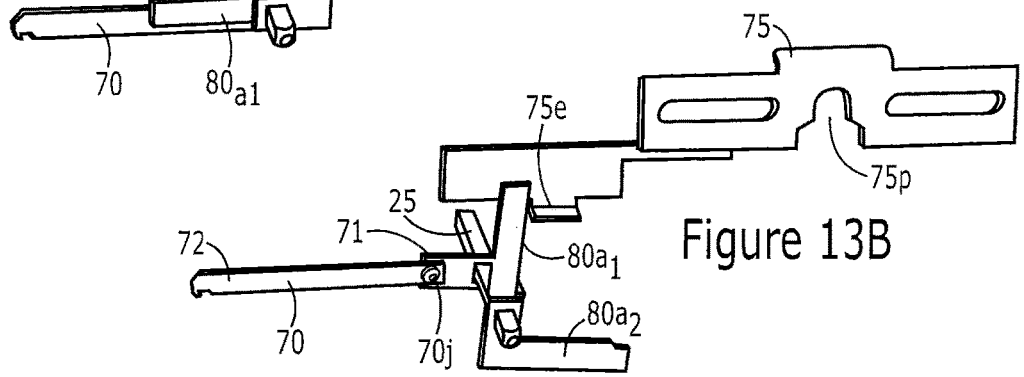
FIG. 13B is a front perspective view of the exemplary left hand breaker linkage, illustrating the configuration of the linkage when the handle is in an ON position according to embodiments of the present invention.

In some embodiments, a monolithic shaped (typically rigid metal) member M can define both the short link 71 and at least one of the cam arms 80a as shown in FIGS. 12B and 13A, for example.

Figure 14A:
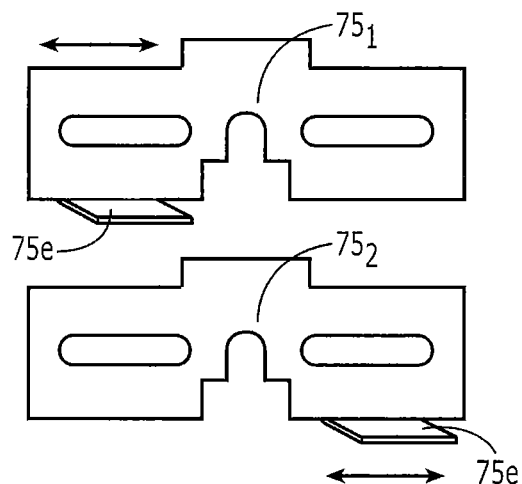
FIGS. 14A and 14B are schematic illustrations of alternative shutter configurations according to embodiments of the present invention.
Figure 14B:
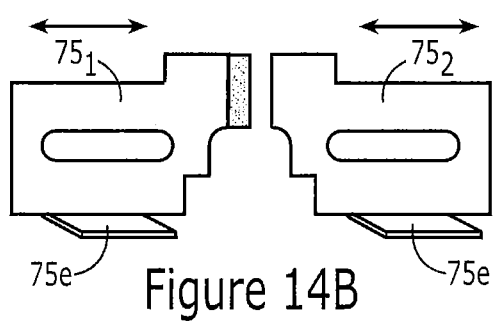

The shutter 75 can be provided as a single shutter that cooperates with the right and left cams 80 of both handles 20h as shown. Alternatively, two or more separate shutters may be provided, such as one for each handle 20h and respective cam 80. For example, if two shutters are used, 75₁, 75₂, one can reside in front of the other and independently slide right and left in response to respective handle position 20h (FIGS. 14A, 14B). In other embodiments, the two shutters can reside in the same plane and laterally move to provide the access and blocking configurations.

The unit 10 can be configured with an interlock that ensures that the unit disconnect D (e.g., breaker) is OPEN before allowing the unit stabs S to be racked in or out, and when the disconnect D (breaker) is closed, the interlock is configured so that the stabs S must remain closed. The racking system can be configured as a slow break contact arrangement and is not typically designed to breaker the electrical current.

FIG. 15 illustrates an internal compartment of exemplary compact dual feeder/starter units 10 illustrating the cams 80 closely spaced to the respective handle 20h and illustrating that one shaft 25 can be longer than the other. FIG. 15 shows a longer shaft 25 on the right side operator mechanism placing the operator mechanism sliders 150, 152 (FIG. 19) further back in the unit housing 10h, closer to the back wall 10b.

The longer shaft 25 can have a length that is between about 3 inches to about 5 inches. The longer shaft 25 can be between 1.5-10 times (e.g., 1.5×-10×) the length of the other shaft, e.g., about 1.5×, about 2×, about 3×, about 4×, about 5×, about 6×, about 7×, about 8×, about 9× or about 10× the length of the other shaft 25. Typically the longer shaft is between about 1.5× to about 5× the length of the shorter shaft. The longer shaft 25 can be configured to have a primary shaft body attached to an extension that provides the additional length or may be a unitary body.

Figure 16:
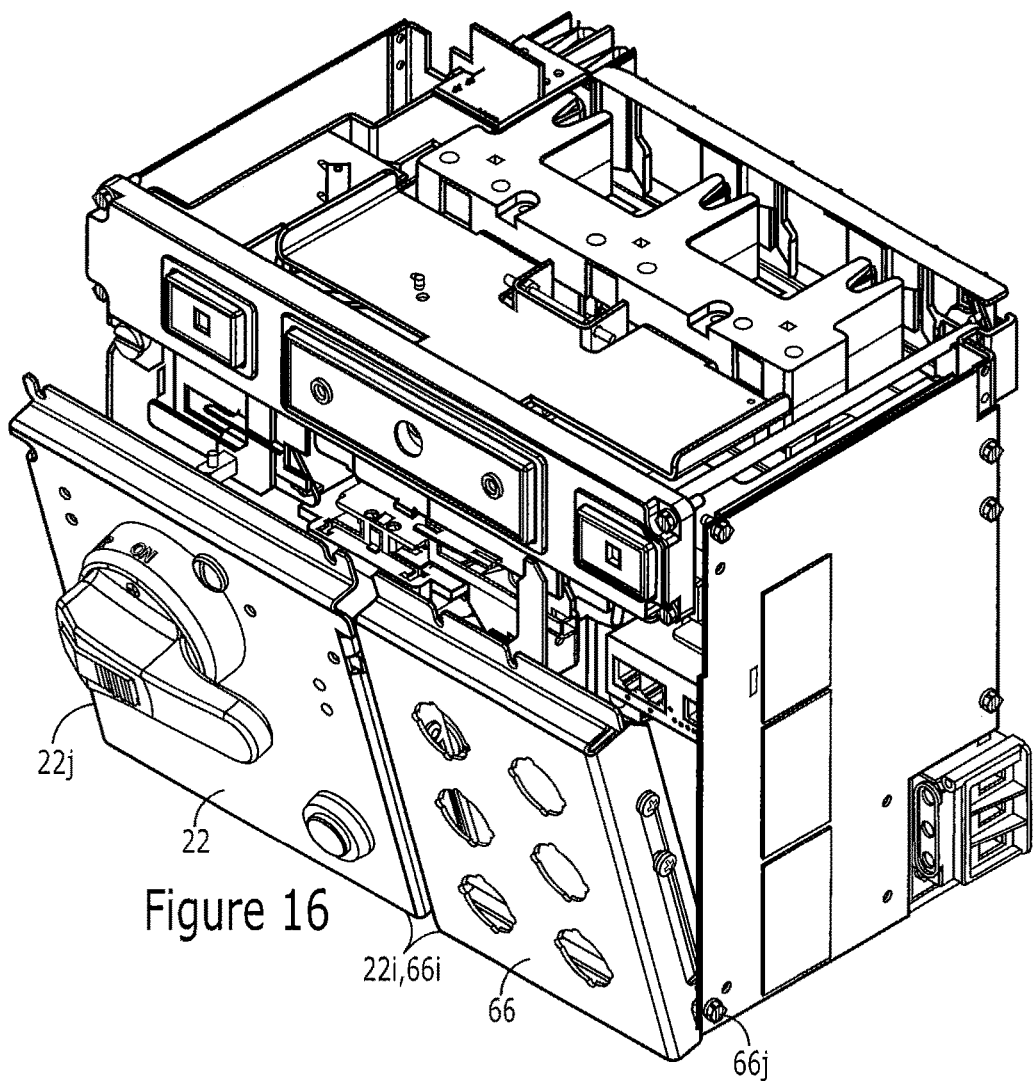
FIG. 16 is a side perspective view of the unit shown in FIG. 8, illustrating the handle sub-panel and the pilot device sub-panel joined together to be able to pivot outward and inward in concert and engage unit interlocks according to embodiments of the present invention.
Figure 17:
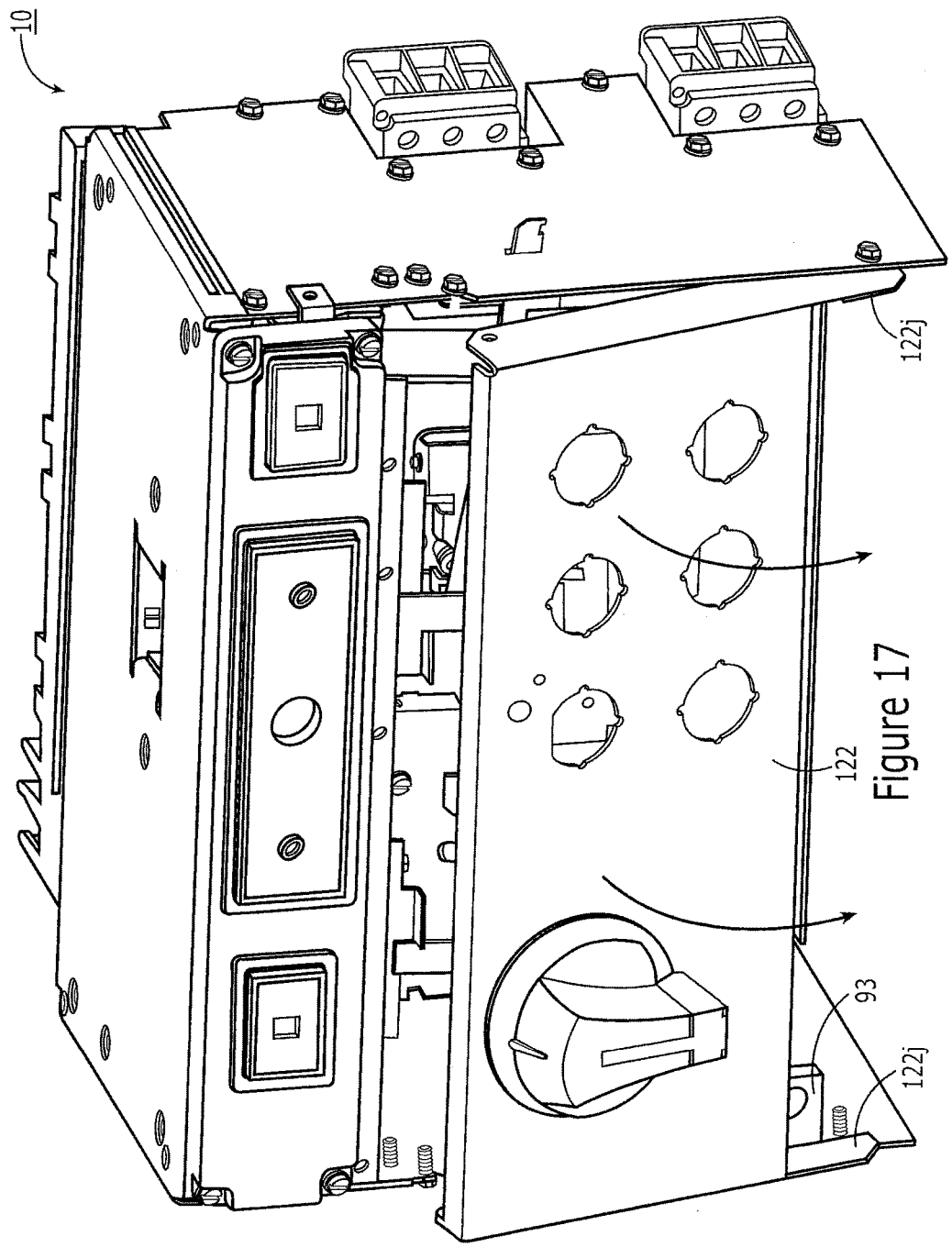
FIG. 17 is a side perspective view of the unit shown in FIG. 7, also illustrating the handle panel and the pilot device panel as a common panel to pivot outward and inward in concert and engage unit interlocks according to embodiments of the present invention.
Figure 18:
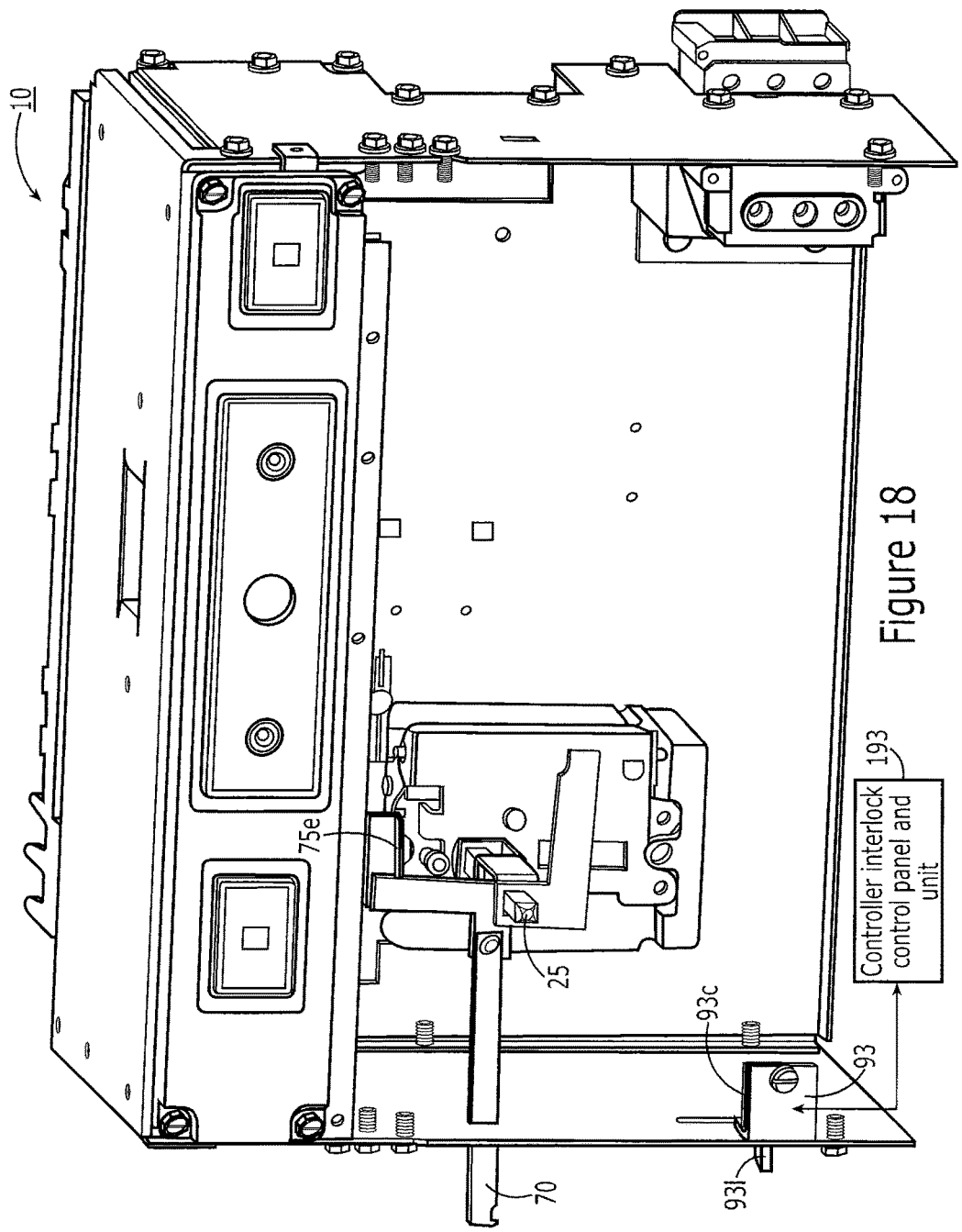
FIG. 18 is a side perspective view of a unit illustrating a left hand linkage in the unit and a unit interlock which engages the front hinged panel shown in FIGS. 16 and 17, for example, and which is controlled by a controller for interlock control according to embodiments of the present invention.

Referring to FIG. 16, in some embodiments the disconnect handle 20h on sub-panel and/or door 22 and the device sub-panel 66 can be attached at the inner sides 22i, 66i to be able to pivot outwardly in concert via joints 66j, 22j, for example. Referring to FIG. 17, in some embodiments, the unit 10 can have a long (single) panel 122 that holds the handle 20h and the pilot devices/components 166 and can be configured to pivot outward. Typically, the pivot attachment includes outer lower pivot joints 122j at the bottom corner portions of the unit 10 as shown in FIG. 17. With the configurations shown in FIGS. 16 and 17, the hinged panel 122 or attached sub-panels 66, 22, can be interlocked with the unit interlock 93 as shown in FIG. 18. The unit interlock 93 can be in communication with an electronic controller 193 that controls the release or the interlock 93. The interlock 93 may include an automated clamp or latch 93c that holds the lower end of the panel 122 or sub-panels 22 and 66, and may include a latch 93l that extends out of the sidewall 13 to prevent the panel(s) from pivoting when the interlock is engaged.

As shown in FIG. 19, the unit 10 can include a disconnect D such as a molded case circuit breaker (MCCB) 10C or disconnect switch 10S, one or both of which can be operated by an internal operating handle mechanism 40 commonly called the "op-mech" or "operator mechanism" or "disconnect operator". The disconnect switch 10S can include an integrated fuse or may be connected to a fuse, in some embodiments. This op-mech 40 can be configured to mount over the lever 190, e.g., a breaker's integral lever and/or an ON/OFF switch lever of disconnect switch. The op-mech 40 allows a user to operate the circuit breaker 10C or switch 10S with the door 22 of the motor control center unit 10 closed. The door 22 and/or handle 20h itself can include visual indicia I (FIGS. 5A/5B/5C), e.g., text and/or color, that identifies an operational status by position, e.g., Reset "R", OFF, TRIPPED and ON. The TRIPPED indicia may be omitted for fuse systems. It is noted that for ease of discussion, the dual feeders are used by way of example. However, a respective feeder can be replaced with a starter and any unit 10 can include two starter circuits, two feeder circuits or a starter and a feeder, for example.

For a circuit breaker configuration, the handle 20 can move between circuit breaker conduction to circuit breaker non-conduction. Where a rotating handle is used, typically, there is about a 90° rotation from conduction to non-conduction ("OFF" to "ON") but other defined rotational stroke distances may be used including, for example, about 45 degrees, about 120 degrees, or about 180 degrees. For a fused disconnect, a similar rotation can be used to cause the ON/OFF.

As shown in FIG. 19, for example, the operator mechanism 40 can include a drive gear 142, a pinion gear 144, and an operator rack gear 146. Generally summarized, the handle 20h via shaft 25 is keyed to interface with the rotary drive gear 142. Drive gear 142 interacts mechanically with pinion gear 144. Pinion gear 144 also interacts with the linearly translating moveable rack 146. Consequently, as the handle 20h rotates, because it is interlocked with the drive gear 142, the drive gear 142 rotates on its axis, thus rotating the pinion gear 144, which then linearly moves the rack 146. The rack 146 then moves the operator slider 152 over operator base 150 which moves to trip lever 190 as the handle 20h moves. The operator base 150 can be stationary and affixed to an inner housing. The base 150 can have a horizontally oriented elongate slot 150s that is aligned with a smaller slot 152s in the operator slider 152. The slots 150s, 152s cooperate to hold lever 190 (toggle) and when the operator slider with slot 152s moves to the right (based on rotation of the handle 20h, for example), this moves the lever 190 to the right along the path defined by slot 150s. It is noted that the lever 190 (also known as a toggle) can move laterally as shown or the circuit breaker or fuse switch may be oriented to move vertically.

The base 150 and cooperating slider 152 can be provided in different sizes with different length and width slots 150s to accommodate smaller and larger toggles or switches 190 associated with frames of different sizes/amperage rating.

For fused switch disconnects, the gear 142 in communication with a rack gear 146 may optionally be configured to move up and down or orthogonal to the rack gear 146. This movement can engage and move a fuse switch lever or input, up and down for ON/OFF operation. Exemplary fuses are FUSETRON™ 600V Class RK5 fuses (BU-SB13729) available from Cooper Bussmann Company, St. Louis, Mo. However, the design is flexible and can accommodate other fuses including those in different classes. For additional description of an example of an operator mechanism and components thereof for fused disconnects, see, e.g., U.S. Provisional Application Ser. No. 61/890,495, now published as U.S. Patent Application Publication number US 2015/0103472, the contents of which are hereby incorporated by reference as if recited in full herein.

Referring again to FIG. 19, for units 10 with circuit breakers 10C, the operating mechanism 40 can also include a trip assist spring 143 that is in communication with the rack gear 146 to assist the handle 20h to move to a consistent OFF position when the circuit breaker is tripped. For additional description of an example of an operator mechanism and components thereof, see, e.g., U.S. Provisional Application Ser. No. 61/890,495, now published as U.S. Patent Application Publication number US 2015/0103472, the contents of which are hereby incorporated by reference as if recited in full herein.

Figure 20:
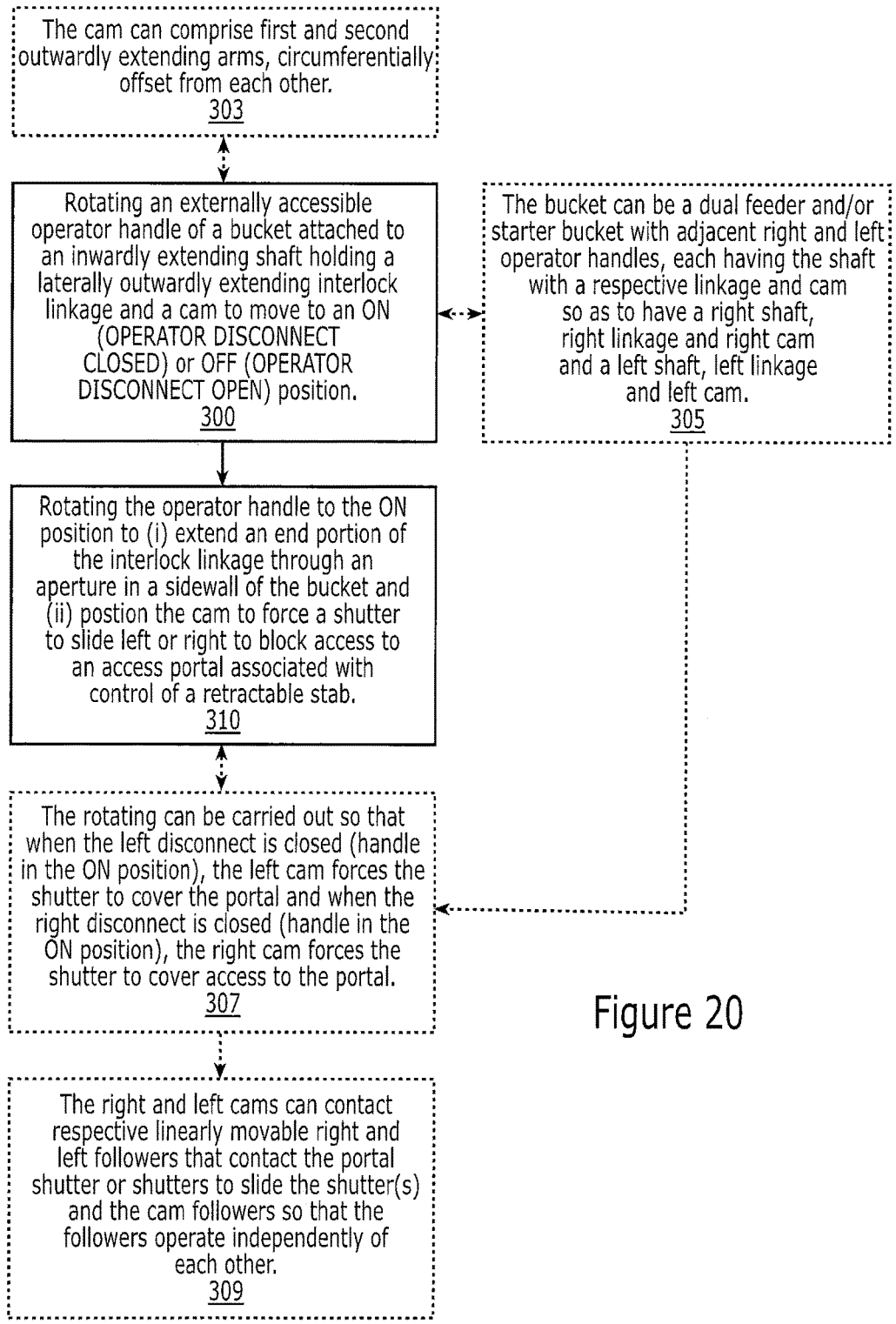
FIG. 20 is a flow chart of exemplary operation of a unit with an interlock associated with a portal shutter according to embodiments of the present invention.

FIG. 20 is a flow chart of exemplary operations that can be used to provide portal access using at least one sliding shutter. An externally accessible operator handle of a bucket or unit attached to an inwardly extending shaft and holding a laterally outwardly extending interlock linkage and a cam can be rotated to move to an ON (OPERATOR DISCONNECT CLOSED) or OFF (OPERATOR DISCONNECT OPEN) position (block 300). The operator handle can be rotated to the ON position to (i) extend an end portion of the interlock linkage through an aperture in a sidewall of the bucket and (ii) position the cam to force a shutter to slide left or right to block access to an access portal associated with control of a retractable stab (block 310).

The cam can comprise first and second outwardly extending arms, the arms being (circumferentially) spaced apart about the shaft (block 303). The spacing can be about 90 degrees. The angular spacing can correspond with the angular spacing between ON and OFF for a respective handle 20h orientation.

The bucket can be a dual starter and/or feeder with adjacent right and left operator handles, each having the shaft with a respective linkage and cam so as to have a right shaft, right linkage and right cam, and a left shaft, left linkage and left cam (block 305).

The rotating can be carried out so that when the left disconnect is closed (handle in the ON position), the left shutter covers access to the portal and when the right disconnect is closed (handle in the ON position), the right shutter covers access to the portal (block 307).

The right and left cams can contact respective linearly movable right and left followers that contact the portal shutter to slide the shutter and the cam followers so that the cam followers operate independently of each other (block 309).

The right and left cam followers can operate independently of each other to more a common shutter or move two shutters to block the stab isolation access portal 43. Moving either disconnect handle 20h to the open position OPEN can cause the shutter to open the portal 43. Both disconnect handles 20h can be required to be OPEN before the shutter portal 75 is aligned with the stab isolation portal 43 to allow access to the portal 43.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A bucket assembly, comprising:
   a unit housing having a stab isolation access portal and laterally spaced apart right and left sidewalls;
   an operator handle coupled to the unit housing;
   an inwardly extending shaft in the unit housing coupled to the operator handle;
   an interlock member held in the unit housing, wherein the interlock member is configured to laterally extend and retract, wherein, when extended, the interlock member extends out an aperture in at least one of the right or left sidewall of the unit housing, and when retracted, the interlock member does not extend out the aperture in the at least one of the right or left sidewall of the unit housing;
   retractable power stabs held by the unit housing, wherein the retractable power stabs are configured to be able to extend out of a rear of the unit housing when in an extended position, and the retractable power stabs are configured to be able to retract into the rear of the unit housing when in a retracted position; and
   a laterally slidable shutter residing in the unit housing and comprising a shutter portal that laterally slides between first and second positions, wherein, in the first position, the shutter portal is aligned with and behind the stab isolation access portal, and wherein, in the second position, the shutter portal is laterally offset from the stab isolation access portal and blocks access to the stab isolation access portal;

wherein the interlock member is retracted into the unit housing when the shutter portal is in the first position and the retracted power stabs are in the retracted position, and wherein the interlock member extends out the aperture in the at least one of the right or left sidewall of the unit housing when the shutter portal is in the second position and the retracted power stabs are in the extended position.

2. The assembly of claim 1, wherein the operator handle is a first operator handle and the inwardly extending shaft is a first inwardly extending shaft, the assembly further comprising:
a second operator handle spaced apart from the first operator handle and coupled to the unit housing; and
a second inwardly extending shaft in the unit housing coupled to the second operator handle.

3. The assembly of claim 2, further comprising a first circuit breaker in the unit housing coupled to the first operator handle and a second circuit breaker in the unit housing coupled to the second operator handle.

4. The assembly of claim 1, wherein the unit housing comprises a front panel extending between the right and left sidewalls, and wherein the assembly further comprises a unit interlock held by the unit housing that latches the front panel closed.

5. The assembly of claim 1, wherein the laterally slidable shutter, resides above the operator handle.

6. The assembly of claim 1, further comprising at least one shutter cam attached to the inwardly extending shaft behind the operator handle, wherein the at least one shutter cam is cooperably engaged with the shutter.

7. The assembly of claim 6, wherein the shutter comprises a primary body that is planar and extends in a vertical orientation, wherein the primary body comprises the shutter portal, and wherein the shutter further comprises a side portion that extends laterally outward from the primary body of the shutter, behind and above the operator handle.

8. The assembly of claim 7, wherein the primary body of the shutter comprises at least one horizontally oriented slot spaced apart from the shutter portal.

9. The assembly of claim 7, wherein the unit housing holds the shutter to reside closer to a front of the unit housing than a rear of the unit housing.

10. The assembly of claim 7, wherein the side portion of the shutter has a height that is less than that of the primary body and comprises a ledge that cooperably engages the at least one shutter cam to move the shutter between the first and second positions.

11. The assembly of claim 10, wherein the ledge is at a height that is aligned with an upper portion of the at least one shutter cam.

12. The assembly of claim 7, wherein the primary body of the shutter further comprises right and left side horizontally oriented and laterally spaced apart slots that reside a spaced apart distance from the shutter portal and are separated from the shutter portal by a closed wall segment of the shutter.

13. The assembly of claim 7, wherein each of the at least one shutter cam has a cam body that is parallel to the primary body of the shutter, and wherein each of the at least one shutter cam has an upper portion that resides above a lower edge of the side portion of the shutter.

14. The assembly of claim 6, wherein the operator handle is a right operator handle and the inwardly extending shaft is a right inwardly extending shaft and is attached to a right shutter cam of the at least one shutter cam in the unit housing, wherein the assembly further comprises:

a left rotary operator handle coupled to the unit housing attached to a left inwardly extending shaft in the unit housing;
a left shutter cam of the at least one shutter cam in the unit housing that is attached to the left inwardly extending shaft; and
wherein the left and right shutter cams independently move the shutter right and left.

15. The assembly of claim 1, wherein the operator handle is a rotary operator handle.

16. A motor control center (MCC), comprising:
a cabinet with first and second sidewalls defining an enclosure with a plurality of compartments, the compartments configured to removably receive a plurality of bucket assemblies, wherein at least one of the bucket assemblies comprises:
a unit housing having a stab isolation access portal and laterally spaced apart right and left sidewalls;
an operator handle coupled to the unit housing;
an inwardly extending shaft in the unit housing coupled to the operator handle;
an interlock member configured to laterally extend and retract, wherein, when extended the interlock member extends out an aperture in at least one of the right or left sidewall of the unit housing, and when retracted, the interlock member does not extend out the aperture in the at least one of the right or left sidewall of the unit housing;
retractable power stabs held by the unit housing, wherein the retractable power stabs are configured to be able to extend out of a rear of the unit housing to engage one or more bus bars when in an extended position, and the retractable power stabs are configured to be able to retract into the rear of the unit housing when in a retracted position; and
at least one shutter with a shutter portal in the unit housing, wherein the at least one shutter laterally slides right and left between aligned and misaligned positions relative to the stab isolation access portal,
wherein, when in the misaligned position, the shutter portal is misaligned with the stab isolation access portal to block access to the stab isolation access portal when the retractable power stabs are in the extended position and the operator handle is in an ON position associated with electric current being conducted through at least one stab of the retractable power stabs, and
wherein, when in the aligned position, the shutter portal aligns with the stab isolation access portal to allow access to the stab isolation access portal when the retractable power stabs are in the retracted position and the operator handle is in an OFF position associated with non-electric conduction through the retractable power stabs.

17. The MCC of claim 16,
wherein the at least one shutter comprises at least one side portion that laterally extends from a primary body of each of the at least one shutter, wherein the primary body of each of the at least one shutter comprises at least a portion of the shutter portal.

18. The MCC of claim 17, wherein the at least one shutter is a single shutter having the primary body, wherein the primary body is planar and is parallel to a cam body of at least one shutter cam that is coupled to the inwardly extending shaft, and wherein the at least one side portion of the single shutter has a height that is less than a height of the primary body of the at least one shutter.

19. The MCC of claim 17, wherein the primary body of each of the at least one shutter is planar and vertically oriented to provide the shutter portal at a height associated with the stab isolation access portal at a front of the unit housing, wherein the at least one side portion of the at least one shutter has an outwardly projecting ledge residing below the stab isolation access portal that slidably engages the at least one shutter cam to move each of the at least one shutter right and left between the aligned and misaligned positions.

20. The MCC of claim 16, wherein the bucket assembly comprises at least one horizontally oriented circuit breaker, and wherein the operator handle is a rotary operator handle.

* * * * *